(12) United States Patent
Shike

(10) Patent No.: US 9,734,540 B2
(45) Date of Patent: Aug. 15, 2017

(54) CONSTRUCTION MANAGEMENT SYSTEM

(71) Applicant: Komatsu Ltd., Tokyo (JP)

(72) Inventor: Chikashi Shike, Tokyo (JP)

(73) Assignee: Komatsu Ltd., Tokyo (JP)

(*) Notice: Subject to any disclaimer, the term of this patent is extended or adjusted under 35 U.S.C. 154(b) by 0 days.

(21) Appl. No.: 14/889,256

(22) PCT Filed: Jan. 30, 2015

(86) PCT No.: PCT/JP2015/052776
§ 371 (c)(1),
(2) Date: Nov. 5, 2015

(87) PCT Pub. No.: WO2015/156018
PCT Pub. Date: Oct. 15, 2015

(65) Prior Publication Data
US 2016/0225106 A1    Aug. 4, 2016

(51) Int. Cl.
| | | |
|---|---|---|
| G08G 1/123 | (2006.01) | |
| G06Q 50/08 | (2012.01) | |
| E02F 9/26 | (2006.01) | |
| G06Q 10/06 | (2012.01) | |
| G07C 5/02 | (2006.01) | |
| G08G 1/00 | (2006.01) | |

(52) U.S. Cl.
CPC .............. G06Q 50/08 (2013.01); E02F 9/26 (2013.01); G06Q 10/06313 (2013.01); G07C 5/02 (2013.01); G08G 1/20 (2013.01)

(58) Field of Classification Search
CPC ... G06Q 50/08; G06Q 10/06313; H04W 4/02; H04W 4/021; H04W 4/023; H04W 4/008; E02F 9/26; G07C 5/02; G08G 1/20
USPC ............................. 340/988, 991, 993, 903
See application file for complete search history.

(56) References Cited

U.S. PATENT DOCUMENTS

2008/0086685 A1* 4/2008 Janky ................... G06Q 10/087
                                                         715/700
2010/0324955 A1* 12/2010 Rinehart ............ G06Q 10/0637
                                                         705/7.36

FOREIGN PATENT DOCUMENTS

| JP | 2005-255339 A | 9/2005 |
|---|---|---|
| JP | 2010-073031 A | 4/2010 |
| JP | 2010-191562 A | 9/2010 |

(Continued)

OTHER PUBLICATIONS

International Search Report mailed Apr. 14, 2015, issued for PCT/JP2015/052776.

*Primary Examiner* — Thomas Mullen

(57) ABSTRACT

A construction management system includes: a transmitter disposed in a transportation vehicle and configured to transmit radio waves including specific data of the transportation vehicle; a mobile terminal disposed in a loading machine; a reception section provided in the mobile terminal and configured to receive the radio waves from the transmitter; a detection section provided in the mobile terminal and configured to detect intensity of the radio waves received by the reception section; a specific data acquisition section provided in the mobile terminal and configured to acquire the specific data from the radio waves received by the reception section; and a work management section configured to generate result data indicating that the transportation vehicle has approached the loading machine based on the intensity detected by the detection section and the specific data acquired by the specific data acquisition section.

18 Claims, 11 Drawing Sheets

(56) References Cited

FOREIGN PATENT DOCUMENTS

| JP | 2010-216198 A | 9/2010 |
|---|---|---|
| JP | 2012-518850 A | 8/2012 |

* cited by examiner

| APPROACH TIME POINT | SEPARATION TIME POINT | TRANS-PORTATION VEHICLE | OPERATOR |
|---|---|---|---|
| 2015/01/19 08:00 | 2015/01/19 08:05 | No.01 | A |
| 2015/01/19 08:15 | 2015/01/19 08:19 | No.02 | B |
| 2015/01/19 08:32 | 2015/01/19 08:40 | No.03 | C |
| 2015/01/19 09:11 | 2015/01/19 09:16 | No.01 | A |
| ⋮ | ⋮ | ⋮ | ⋮ |

CONSTRUCTION MANAGEMENT SYSTEM

FIELD

The present invention relates to a construction management system.

BACKGROUND

At a civil engineering construction site where loading machines and transportation vehicles are operated, a construction management system that manages the loading machines and transportation vehicles may be used. An example of a construction management system that manages departure and arrival times of the transportation vehicles from/at the construction site and traveling and stop times of the loading machines is disclosed in Patent Literature 1.

CITATION LIST

Patent Literature

Patent Literature 1: Japanese Laid-open Patent Publication No. 2010-073031

SUMMARY

Technical Problem

At the construction site, a loading function of loading cargo such as earth and sand onto the transportation vehicle is performed by the loading machine, and a transportation function of transporting the cargo is performed by the transportation vehicle. In order to improve work efficiency at the construction site, it is necessary to accurately grasp a status of the loading and transportation functions. For example, by specifying a transportation vehicle for which the loading function is performed from among a plurality of transportation vehicles and by grasping the number of times of transportation function to be performed by a specific transportation vehicle, improvement of work efficiency at the construction site can be expected.

An object of an aspect of the present invention is to provide a construction management system capable of improving work efficiency at a construction site.

Solution to Problem

According to a first embodiment of the invention, there is provided a construction management system comprising: a transmitter disposed in a transportation vehicle and configured to transmit radio waves including specific data of the transportation vehicle; a mobile terminal disposed in a loading machine; a reception section provided in the mobile terminal and configured to receive the radio waves from the transmitter; a detection section provided in the mobile terminal and configured to detect intensity of the radio waves received by the reception section; a specific data acquisition section provided in the mobile terminal and configured to acquire the specific data from the radio waves received by the reception section; and a work management section configured to generate result data indicating that the transportation vehicle has approached the loading machine based on the intensity detected by the detection section and the specific data acquired by the specific data acquisition section.

According to a second embodiment of the invention, there is provided a construction management system comprising: a transmitter disposed in a loading machine and configured to transmit radio waves including specific data of the loading machine; a mobile terminal disposed in a transportation vehicle; a reception section provided in the mobile terminal and configured to receive the radio waves from the transmitter; a detection section provided in the mobile terminal and configured to detect intensity of the radio waves received by the reception section; a specific data acquisition section provided in the mobile terminal and configured to acquire the specific data from the radio waves received by the reception section; and a work management section configured to generate result data indicating that the loading machine has approached the transportation vehicle based on the intensity detected by the detection section and the specific data acquired by the specific data acquisition section.

Advantageous Effects of Invention

According to an aspect of the present invention, there can be provided a construction management system capable of improving work efficiency at a construction site.

DESCRIPTION OF EMBODIMENTS

Hereinafter, embodiments of the present invention will be described with reference to the drawings, but the present invention is not limited thereto. Constituent elements of the embodiments described below may be combined suitably. Further, some constituent elements may be removed.

First Embodiment

Figure 1:
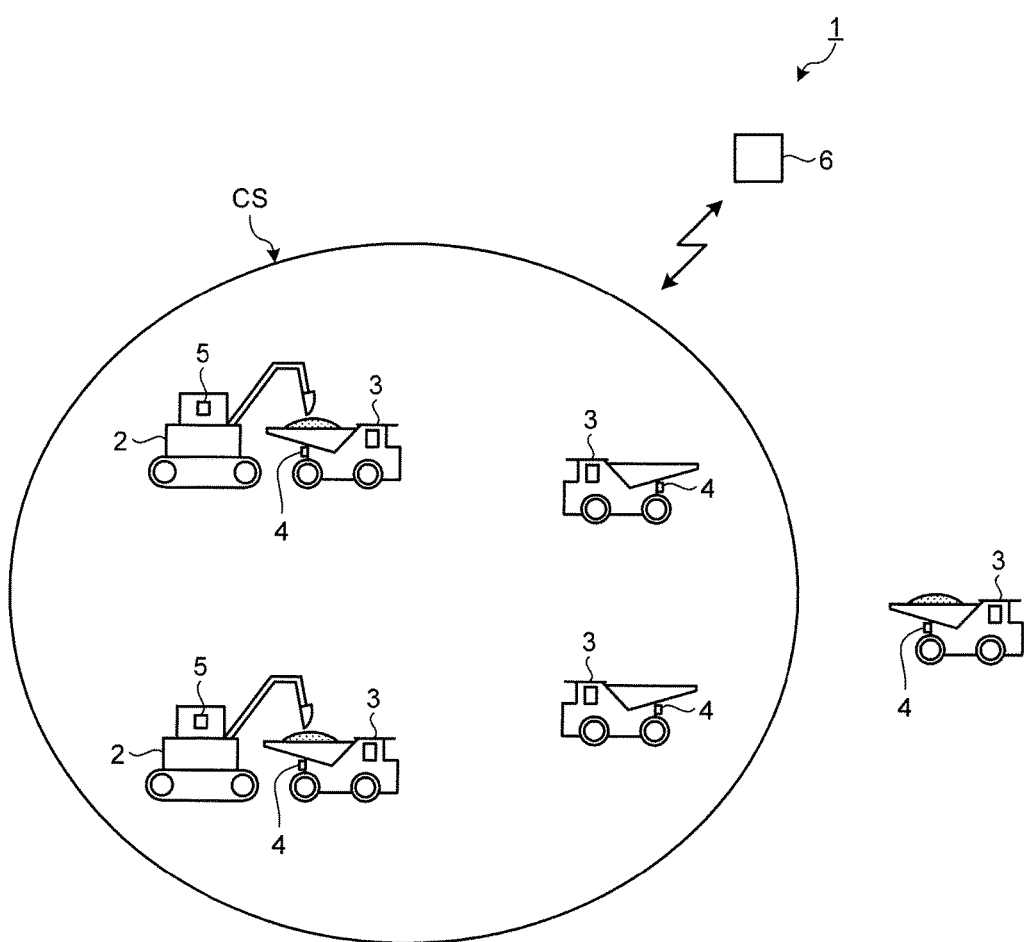
FIG. 1 is an exemplary view illustrating an example of a construction management system according to a first embodiment.
Figure 2:
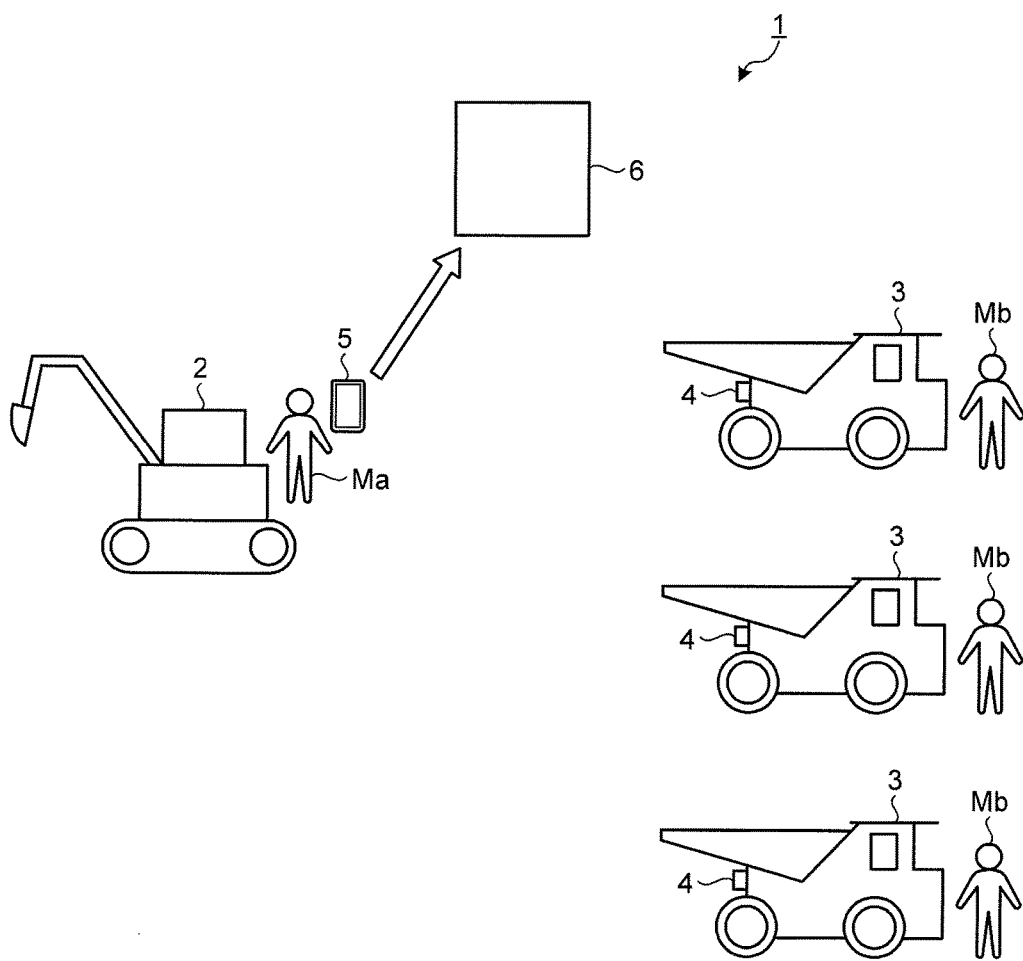
FIG. 2 is an exemplary view illustrating an example of the construction management system according to the first embodiment.

A first embodiment will be described. FIGS. 1 and 2 are exemplary views each illustrating an example of a construction management system 1 according to the present embodiment.

The construction management system 1 manages a civil engineering construction site CS. At the construction site CS, a loading machine 2 and a transportation vehicle 3 are operated. The loading machine 2 includes at least one of an excavator and a wheel loader. The transportation vehicle 3 includes a dump truck having a vessel. At the construction site CS, a loading function of loading cargo such as earth and sand onto the transportation vehicle 3 is performed by the loading machine 2. Further, a transportation function of transporting the cargo is performed by the transportation vehicle 3. The transportation vehicle 3 transports the cargo loaded thereon at the construction site CS outside the construction site CS.

The loading machine 2 has an operation room for an operator Ma to get in. The loading machine 2 is operated by operation of the operator Ma. The transportation vehicle 3 has an operation room for an operator Mb to get in. The transportation vehicle 3 is operated by operation of the operator Mb.

The loading function may be performed by one loading machine 2 or a plurality of loading machines 2. The transportation function is performed by a plurality of transportation vehicles 3.

The construction management system 1 has a transmitter 4 disposed in the transportation vehicle 3 and configured to transmit radio waves and a mobile terminal 5 disposed in the loading machine 2 and configured to receive the radio waves from the transmitter 4.

The construction management system 1 further has a server 6 that can communicate with the mobile terminal 5.

The transmitter 4 is mounted in the transportation vehicle 3. The transmitter 4 transmits radio waves including specific data of the transportation vehicle 3. The transmitter 4 and mobile terminal 5 communicate with each other by radio. The mobile terminal 5 receives the radio waves including the specific data transmitted from the transmitter 4. In the present embodiment, the transmitter 4 is a beacon terminal. The beacon terminal can transmit radio waves including specific data.

The specific data includes data for specifying the transmitter 4 and transportation vehicle 3 in which the transmitter 4 is mounted. The transmitter 4 is mounted in each of the plurality of transportation vehicles 3. The transmitter 4 is associated with each transportation vehicle 3. Each of the plurality of transmitters 4 transmits radio waves including the specific data of the transportation vehicle 3 in which the transmitter 4 is mounted. For example, a transmitter 4 mounted in a first transportation vehicle 3 of the plurality of transportation vehicles 3 transmits radio waves including first specific data for specifying the first transportation vehicle 3. Further, for example, a transmitter 4 mounted in a second transportation vehicle 3 of the plurality of transportation vehicles 3 transmits radio waves including second specific data for specifying the second transportation vehicle 3.

The mobile terminal 5 is carried by the operator Ma of the loading machine 2. The mobile terminal 5 receives the radio waves transmitted from the transmitter 4. The mobile terminal 5 includes a mobile computer such as a smartphone or a tablet-type personal computer. Application software for receiving the radio waves from the transmitter 4 is installed in the mobile terminal 5. Upon reception of the radio waves transmitted from the transmitter 4, the mobile terminal 5 performs processing based on the application software.

The mobile terminal 5 specifies the transmitter 4 that transmits the radio waves from among the plurality of transmitters 4 based on the specific data included in the received radio waves. The transmitter 4 is associated with the transportation vehicle 3. Based on the specific data included in the received radio waves, the mobile terminal 5 specifies, from among the plurality of transportation vehicles 3, the transportation vehicle 3 in which the transmitter 4 that has transmitted the radio waves is mounted. For example, when receiving the radio waves including the first specific data, the mobile terminal 5 specifies that the radio waves have been transmitted from the transmitter 4 of the first transportation vehicle 3. Further, for example, when receiving the radio waves including the second specific data, the mobile terminal 5 specifies that the radio waves have been transmitted from the transmitter 4 of the second transportation vehicle 3.

The specific data of the transportation vehicle 3 includes at least one of transportation vehicle identification data for specifying the transportation vehicle 3, operator identification data indicating the operator Mb who operates the transportation vehicle 3, and maximum load data indicating a maximum load of the transportation vehicle 3.

The mobile terminal 5 detects intensity of the received radio waves. The intensity of the radio waves to be received by the mobile terminal 5 varies according to a distance from the transmitter 4. Based on the detected intensity of the radio waves, the mobile terminal 5 can derive the distance between the transmitter 4 and mobile terminal 5 itself.

The mobile terminal 5 generates result data indicating that the transportation vehicle 3 has approached the loading machine 2 based on the intensity of the radio waves and specific data of the transportation vehicle 3 included in the radio waves. The result data includes at least one of approach time-point data indicating a time point at which the transportation vehicle 3 has approached the loading machine 2, separation time-point data indicating a time point at which the transportation vehicle 3 has separated from the loading machine 2, and approach frequency data indicating the number of times that the transportation vehicle 3 has approached the loading machine 2. The mobile terminal 5 transmits the generated result data to the server 6.

The server 6 is disposed in, e.g., a management facility of the construction site CS. The server 6 includes a computer system. The mobile terminal 5 and server 6 communicate with each other by radio. The server 6 acquires the result data transmitted from the mobile terminal 5. The server 6 stores the result data.

Figure 3:
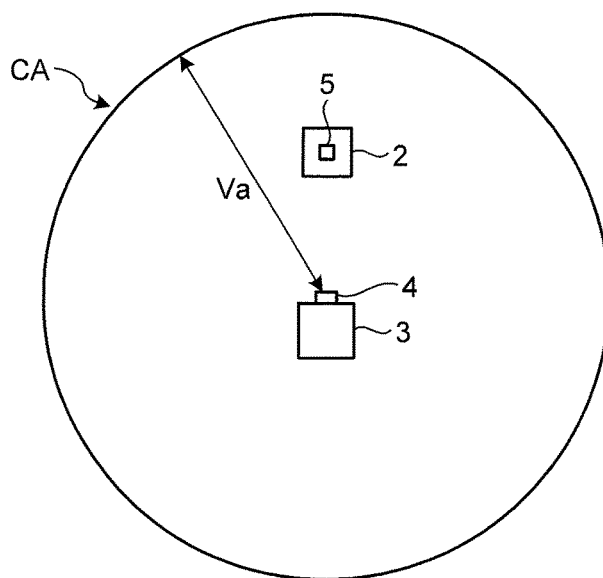
FIG. 3 is an exemplary view illustrating an example of a relationship between a transmitter and a mobile terminal according to the first embodiment.
Figure 4:
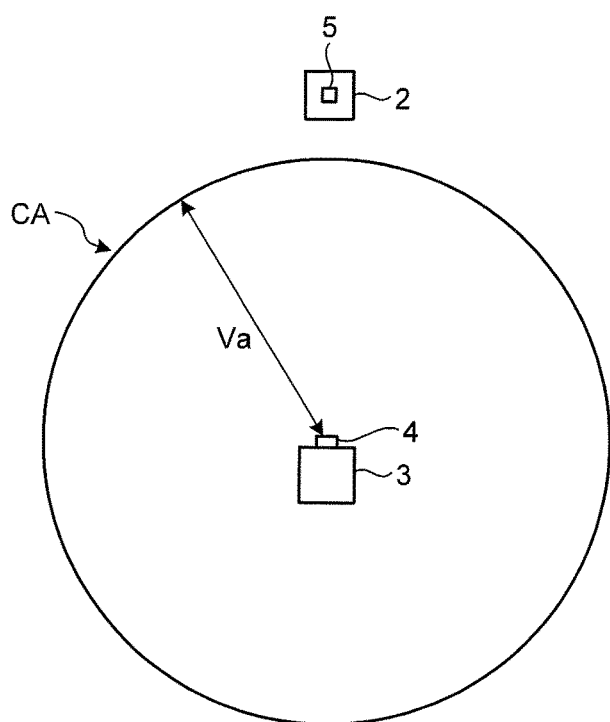
FIG. 4 is an exemplary view illustrating an example of the relationship between the transmitter and the mobile terminal according to the first embodiment.

FIGS. 3 and 4 are exemplary views each illustrating an example of a relationship between the transmitter 4 and mobile terminal 5. The transmitter 4 has a communication area CA. The communication area CA of the transmitter 4 is an area within which the radio waves transmitted from the transmitter 4 can be received at an intensity higher than a predetermined level. As illustrated in FIG. 3, the mobile terminal 5 existing in the communication area CA of the transmitter 4 can receive the radio waves from the transmitter 4. As illustrated in FIG. 4, the mobile terminal 5 existing outside the communication area CA of the transmitter 4 cannot receive the radio waves from the transmitter 4. The transmitter 4 and mobile terminal 5 can communicate with each other by radio within a short range. A maximum value Va of a distance over which the transmitter 4 and mobile terminal 5 can communicate with each other by radio is, e.g., 20 m.

Figure 5:
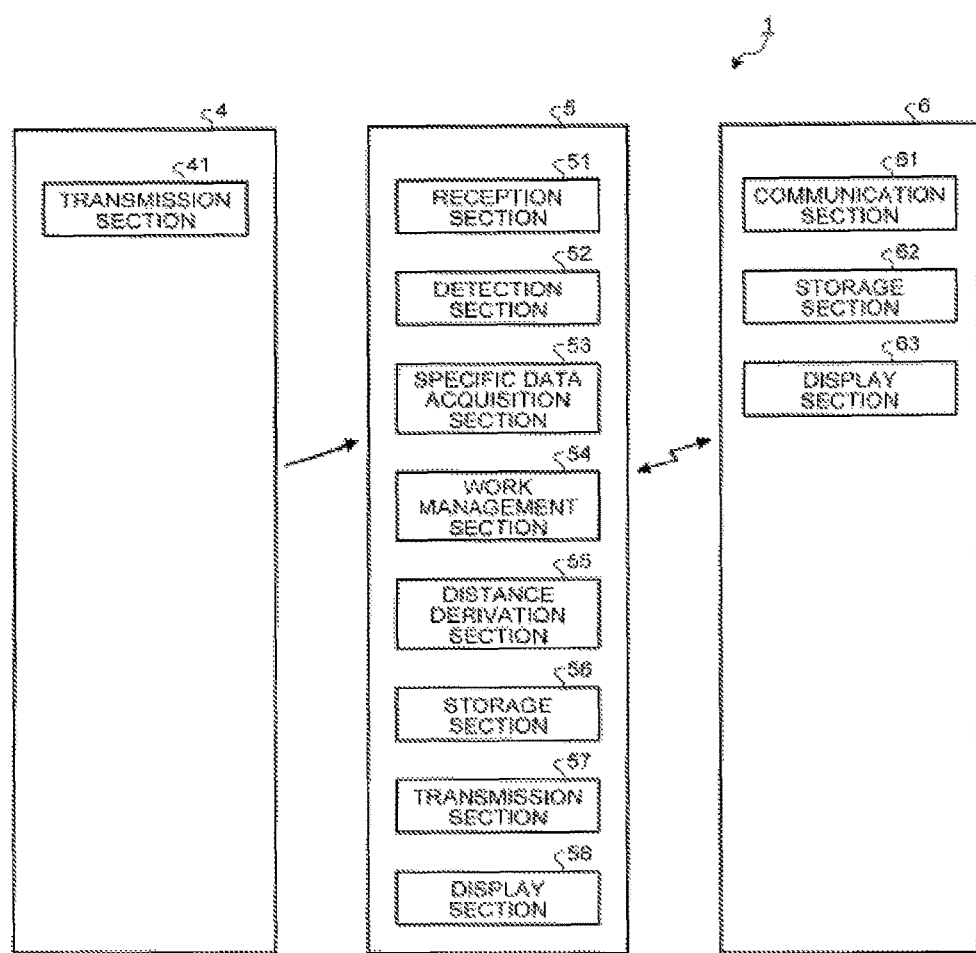
FIG. 5 is a functional block diagram illustrating an example of the construction management system according to the first embodiment.

FIG. 5 is a functional block diagram illustrating an example of the construction management system 1 according to the present embodiment.

The transmitter 4 includes a beacon terminal. The transmitter 4 has a transmission section 41 that transmits the radio waves including the specific data of the transportation vehicle 3.

The mobile terminal 5 includes a computer. The mobile terminal 5 has a reception section 51 that receives the radio waves from the transmitter 4, a detection section 52 that detects the intensity of the radio waves received by the reception section 51, a specific data acquisition section 53 that acquires the specific data of the transportation vehicle 3 from the radio waves received by the reception section 51, and a work management section 54 that generates the result data indicating that the transportation vehicle 3 has approached the loading machine 2 based on the intensity of the radio waves detected by the detection section 52 and specific data of the transportation vehicle 3 acquired by the specific data acquisition section 53.

The mobile terminal 5 further has a distance derivation section 55 that derives the distance between the loading machine 2 and transportation vehicle 3 based on the intensity of the radio waves detected by the detection section 52, a storage section 56, a transmission section 57 that can communicate with the server 6 by radio, and a display section 58 that can display image data.

The server 6 has a communication section 61 that can communicate with the mobile terminal 5 by radio, a storage section 62, and a display section 63 that can display image data.

The reception section 51 receives the radio waves including the specific data transmitted from the transmission section 41. The reception section 51 includes an antenna that can receive radio waves.

The detection section 52 detects the intensity of the radio waves received by the reception section 51. The intensity of the radio waves received by the reception section 51 varies according to the distance between the transmission section 41 and reception section 51. It is said that the intensity of the radio waves varies in proportion to a square of the distance from the transmission section 41. When the distance between the transmission section 41 and reception section 51 is small, the intensity of the radio waves received by the reception section 51 is high. When the distance between the transmission section 41 and reception section 51 is large, the intensity of the radio waves received by the reception section 51 is low.

The specific data acquisition section 53 extracts the specific data of the transportation vehicle 3 from the radio waves received by the reception section 51. The specific data acquisition section 53 specifies, based on the acquired specific data, the transportation vehicle 3 in which the transmitter 4 that has transmitted the radio waves is mounted. Based on the acquired specific data, the specific data acquisition section 53 specifies the operator Mb who operates the transportation vehicle 3 in which the transmitter 4 that has transmitted the radio waves is mounted. Further, based on the acquired specific data, the specific data acquisition section 53 specifies the maximum load of the transportation vehicle 3 in which the transmitter 4 that has transmitted the radio waves is mounted.

The work management section 54 generates the result data indicating that the transportation vehicle 3 has approached the loading machine 2 based on the intensity of the radio waves detected by the detection section 52 and specific data of the transportation vehicle 3 acquired by the specific data acquisition section 53.

The work management section 54 estimates the distance between the transmission section 41 and reception section 51 based on the intensity of the radio waves detected by the detection section 52. When the operator Ma carrying the mobile terminal 5 is occupying the operation room of the loading machine 2, the distance between the transmission section 41 and reception section 51 is estimated, thus allowing the distance between the transportation vehicle 3 and loading machine 2 to be estimated. The work management section 54 can determine, based on the intensity of the radio waves detected by the detection section 52, whether or not the transportation vehicle 3 has approached the loading machine 2. The work management section 54 can determine, based on the intensity of the radio waves detected by the detection section 52, whether or not a state where the transportation vehicle 3 and loading machine 2 separate from each other has changed to a state where they approach each other. The work management section 54 can determine, based on the intensity of the radio waves detected by the detection section 52, whether or not a state where the transportation vehicle 3 and loading machine 2 approach each other has changed to a state where they separate from each other.

The work management section 54 specifies the transportation vehicle 3 in which the transmission section 41 that has transmitted the radio waves is mounted based on the specific data of the transportation vehicle 3 acquired by the specific data acquisition section 53. The work management section 54 can specify, from among the plurality of transportation vehicles 3, the transportation vehicle 3 that has approached the loading machine 2 based on the intensity of the radio waves detected by the detection section 52 and specific data of the transportation vehicle 3 acquired by the specific data acquisition section 53.

The work management section 54 can specify, from among the plurality of transportation vehicles 3, the transportation vehicle 3 of which state has changed from a state where it separates from the loading machine 2 to a state where it approaches the loading machine 2 based on the intensity of the radio waves detected by the detection section 52 and specific data of the transportation vehicle 3 acquired by the specific data acquisition section 53. Further, the work management section 54 can specify, from among the plurality of transportation vehicles 3, the transportation vehicle 3 of which state has changed from a state where it approaches the loading machine 2 to a state where it separates from the loading machine 2 based on the intensity of the radio waves detected by the detection section 52 and specific data of the transportation vehicle 3 acquired by the specific data acquisition section 53.

Further, the work management section 54 can acquire a time point at which the transportation vehicle 3 has approached the loading machine 2 and a time point at which the transportation vehicle 3 has separated from the loading machine 2 based on the intensity of the radio waves detected by the detection section 52. The work management section 54 can specify a time point at which a state where a certain transportation vehicle 3 of the plurality of transportation vehicles 3 separates from the loading machine 2 has changed to a state where it approaches the loading machine 2 based on the intensity of the radio waves detected by the detection section 52 and specific data of the transportation vehicle 3 acquired by the specific data acquisition section 53. The work management section 54 can specify a time point at which a state where a certain transportation vehicle 3 of the plurality of transportation vehicles 3 approaches the loading machine 2 has changed to a state where it separates from the loading machine 2 based on the intensity of the radio waves detected by the detection section 52 and specific data of the transportation vehicle 3 acquired by the specific data acquisition section 53.

Further, the work management section 54 can acquire the number of times that the transportation vehicle 3 has approached the loading machine 2 and the number of times that the transportation vehicle 3 has separated from the loading machine 2 based on the intensity of the radio waves detected by the detection section 52. The work management section 54 can specify the number of times that a state where a certain transportation vehicle 3 of the plurality of transportation vehicles 3 separates from the loading machine 2 has changed to a state where it approaches the loading machine 2 based on the intensity of the radio waves detected by the detection section 52 and specific data of the transportation vehicle 3 acquired by the specific data acquisition section 53. The work management section 54 can specify the number of times that a state where a certain transportation vehicle 3 of the plurality of transportation vehicles 3 approaches the loading machine 2 has changed to a state where it separates from the loading machine 2 based on the intensity of the radio waves detected by the detection section 52 and specific data of the transportation vehicle 3 acquired by the specific data acquisition section 53.

As described above, the work management section 54 can acquire, based on the intensity of the radio waves received by the reception section 51 and specific data included in the radio waves, the time point at which a certain transportation vehicle 3 of the plurality of transportation vehicles 3 has approached the loading machine 2, time point at which the certain transportation vehicle 3 has separated from the loading machine 2, number of times that the certain transportation vehicle 3 has approached the loading machine 2, and number of times that the certain transportation vehicle 3 has separated from the loading machine 2. The work management section 54 generates, based on the intensity of the radio waves detected by the detection section 52 and specific data of the transportation vehicle 3 acquired by the specific data acquisition section 53, the result data including the approach time-point data indicating the time point at which the certain transportation vehicle 3 has approached the loading machine 2, separation time-point data indicating the time point at which the certain transportation vehicle 3 has separated from the loading machine 2, approach frequency data indicating the number of times that the certain transportation vehicle 3 has approached the loading machine 2, and separation frequency data indicating the number of times that the certain transportation vehicle 3 has separated from the loading machine 2.

The mobile terminal 5 receives the radio waves transmitted from each of the transmission sections 41 mounted in the plurality of respective transportation vehicles 3. The work management section 54 of the mobile terminal 5 generates, for each of the plurality of transportation vehicles 3, the result data including the approach time-point data indicating the time point of approach to the loading machine 2, separation time-point data indicating the time point of separation from the loading machine 2, approach frequency data indicating the number of times of approach to the loading machine 2, and separation frequency data indicating the number of times of separation from the loading machine 2.

The mobile terminal 5 carried by the operator Ma is associated with the loading machine 2. When a plurality of loading machines 2 operate at the construction site CS, the loading machine 2 in which the operator Ma gets is fixed. That is, the loading machine 2 in which the mobile terminal 5 is disposed can be specified. The work management section 54 specifies the loading machine 2 in which the mobile terminal 5 is disposed. The work management section 54 can specify, from among the plurality of loading machines 2, the loading machine 2 that the transportation vehicle 3 has approached.

The distance derivation section 55 derives the distance between the loading machine 2 and transportation vehicle 3 based on the intensity of the radio waves detected by the detection section 52. In the present embodiment, first correlation data indicating a relationship between the intensity of the radio waves received by the reception section 51 and distance between the transmission section 41 and reception section 51 corresponding to the intensity of the radio waves is stored in the storage section 56. The first correlation data is previously obtained by experiments or simulations. The distance derivation section 55 derives the distance between the transmission section 41 and reception section 51 based on the intensity of the radio waves detected by the detection section 52 and first correlation data stored in the storage section 56. When the operator Ma carrying the mobile terminal 5 is occupying the operation room of the loading machine 2, the distance between the transmission section 41 and reception section 51 is regarded as the distance between the transportation vehicle 3 and loading machine 2. The distance derivation section 55 can derive the distance between the transportation vehicle 3 and loading machine 2 based on the intensity of the radio waves detected by the detection section 52 and first correlation data stored in the storage section 56.

The work management section 54 can determine whether or not the transportation vehicle 3 has approached the loading machine 2 based on the distance between the loading machine 2 and transportation vehicle 3 derived by the distance derivation section 55. The work management section 54 can generate the result data indicating that the transportation vehicle 3 has approached the loading machine 2 based on the distance between the loading machine 2 and transportation vehicle 3 derived by the distance derivation section 55 and specific data acquired by the specific data acquisition section 53.

The storage section 56 stores the result data generated by the work management section 54. The transmission section 57 transmits by radio the result data of the storage section 56 to the server 6. The display section 58 converts the result data generated by the work management section 54 into image data and displays the image data on a display, such as a flat panel display, provided in the mobile terminal 5.

The communication section 61 communicates with the transmission section 57 of the mobile terminal 5 by radio. The communication section 61 acquires the result data transmitted from the transmission section 57. The storage section 62 stores the result data acquired by the communication section 61. The display section 63 converts the result data acquired by the communication section 61 into image data and displays the image data on a display, such as a flat panel display, connected to the server 6.

Figure 6:
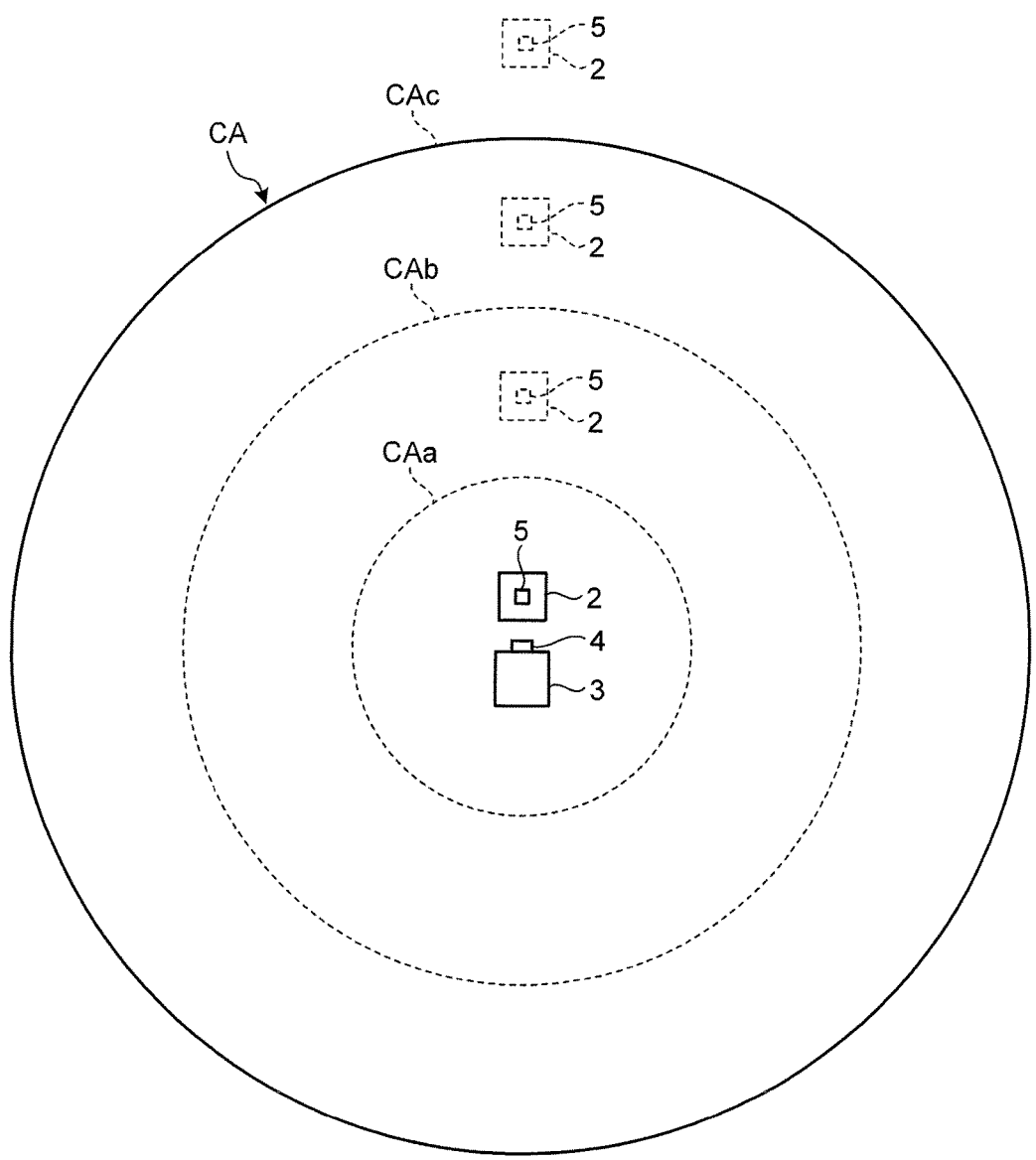
FIG. 6 is an exemplary view illustrating an example of a construction management method according to the first embodiment.

FIG. 6 is an exemplary view illustrating an example of the relationship between the loading machine 2 and transportation vehicle 3. As illustrated in FIG. 6, the transmitter 4 has the communication area CA. When the loading machine 2 exists in the communication area CA, the reception section 51 of the mobile terminal 5 disposed in the loading machine 2 can receive the radio waves from the transmitter 4. The loading function is performed in a state where both the loading machine 2 and transportation vehicle 3 exist in the communication area CA.

The distance derivation section 55 sets, within the communication area CA, a first area CAa over which the radio waves from the transmitter 4 can be received at a first intensity, a second area CAb over which the radio waves from the transmitter 4 can be received at a second intensity lower than the first intensity, and a third area CAc over which the radio waves from the transmitter 4 can be received at a third intensity lower than the second intensity. The first area CAa is set so as to include a mounting position of the transmitter 4. The second area CAb is set around the first area CAa. The third area CAc is set around the second area CAb. When the mobile terminal 5 exists in the first area CAa, the reception section 51 of the mobile terminal 5 receives the radio waves of the first intensity. When the mobile terminal 5 exists in the second area CAb, the reception section 51 of the mobile terminal 5 receives the radio waves of the second intensity. When the mobile terminal 5 exists in the third area CAc, the reception section 51 of the mobile terminal 5 receives the radio waves of the third intensity. The distance derivation section 55 can specify, from among the first, second, and third areas CAa, CAb, and CAc, the area where the mobile terminal 5 exists based on the intensity of the radio waves received by the reception section 51.

If the loading machine 2 and transportation vehicle 3 separate from each other, the loading function is difficult to perform even when both the loading machine 2 and transportation vehicle 3 exists in the communication area CA. When a relative distance between the loading machine 2 and transportation vehicle 3 is equal to or smaller than a predetermined distance, the loading machine 2 and transportation vehicle 3 can perform the loading function. That is, when the loading machine 2 and transportation vehicle 3 approach each other within a predetermined distance or less, the loading machine 2 and transportation vehicle 3 can perform the loading function. For example, when the transportation vehicle 3 exists within an operation range of a work machine provided in the loading machine 2, the loading function can be performed. In other words, the relative distance between the loading machine 2 and transportation vehicle 3 is equal to or smaller than a predetermined distance, the loading function can be performed.

When the relative distance between the loading machine 2 and transportation vehicle 3 is equal to or smaller than a predetermined distance, the intensity of the radio waves received by the reception section 51 is equal to or higher than a threshold value. Thus, the work management section 54 can determine that the loading machine 2 and transportation vehicle 3 can perform the loading function when the intensity of the radio waves received by the reception section 51 is equal to or higher than the threshold value.

On the other hand, when the loading machine 2 and transportation vehicle 3 separate from each other to such a degree that the relative distance therebetween is larger than the predetermined distance, the intensity of the radio waves received by the reception section 51 is lower than the threshold value. Thus, the work management section 54 can determine that the loading machine 2 and transportation vehicle 3 cannot perform the loading function when the intensity of the radio waves received by the reception section 51 is lower than the threshold value.

In the present embodiment, the first correlation data stored in the storage section 56 includes correlation data indicating a relationship between the relative distance between the loading machine 2 and transportation vehicle 3 within which the loading function can be performed and the intensity of the radio waves which are transmitted from the transmission section 41 and received by the reception section 51 at the relative distance.

The work management section 54 can determine, based on the intensity of the radio waves detected by the detection section 52 and first correlation data stored in the storage section 56, whether or not the relative distance between the loading machine 2 and transportation vehicle 3 is a distance at which the loading function can be performed.

In the present embodiment, the first area CAa is a loading function executable area where the loading function can be performed. When both the transportation vehicle 3 and loading machine 2 exist in the first area CAa, the transportation vehicle 3 and loading machine 2 can perform the loading function. When the loading machine 2 exists in the first area CAa, the intensity of the radio waves received by the reception section 51 of the mobile terminal 5 disposed in the loading machine 2 is equal to or higher than the threshold value. When the loading machine 2 exists outside the first area CAa, the transportation vehicle 3 and loading machine 2 cannot perform the loading function. When the loading machine 2 exists outside the first area CAa, the intensity of the radio waves received by the reception section 51 of the mobile terminal 5 disposed in the loading machine 2 is lower than the threshold value.

In the present embodiment, when the intensity of the radio waves received by the reception section 51 has changed from a value lower than the threshold value to a value equal to or higher than the threshold value, the work management section 54 determines that the relative distance between the loading machine 2 and transportation vehicle 3 has changed from a distance at which the loading function cannot be performed to a distance at which the loading function can be performed and thus determines that the loading function of the loading machine 2 loading cargo onto the transportation vehicle 3 has started.

When the intensity of the radio waves received by the reception section 51 is equal to or higher than the threshold value, the work management section 54 determines that the loading function of the loading machine 2 loading cargo onto the transportation vehicle 3 is being performed.

In the present embodiment, when the work management section 54 determines that a time period during which the intensity of the radio waves received by the reception section 51 is maintained at a value equal to or higher than the threshold value has exceeded a predetermined time period, it determines that the loading function is being performed. This allows the work management section 54 to distinguish a transportation vehicle 3 that has approached the loading machine 2 for the loading function from a transportation vehicle 3 that has only passed near the loading machine 2.

Further, when the intensity of the radio waves received by the reception section 51 has changed from a value equal to or higher than the threshold value to a value lower than the threshold value, the work management section 54 determines that the relative distance between the loading machine 2 and transportation vehicle 3 has changed from a distance at which the loading function can be performed to a distance at which the loading function cannot be performed and thus determines that a transportation function of the transportation vehicle 3 transporting cargo has stared.

A time point at which the intensity of the radio waves received by the reception section 51 has changed from a value lower than the threshold value to a value equal to or higher than the threshold value includes a time point at which a state where the transportation vehicle 3 separates from the loading machine 2 has changed to a state where it approaches the loading machine 2 and a time point at which a state where the loading function cannot be performed has changed to a state where the loading function can be performed. The work management section 54 can acquire the time point at which the transportation vehicle 3 has approached the loading machine 2 based on the intensity of the radio waves received by the reception section 51 and can generate the approach time-point data indicating the time point at which the transportation vehicle 3 has approached the loading machine 2. In the present embodiment, the approach time-point data includes loading function start time-point data indicating a time point at which the loading function has started after the approach of the transportation vehicle 3 to the loading machine 2.

A time point at which the intensity of the radio waves received by the reception section 51 has changed from a value equal to or higher than the threshold value to a value lower than the threshold value includes a time point at which a state where the transportation vehicle 3 approaches the loading machine 2 has changed to a state where it separates from the loading machine 2 and a time point at which a state where the loading function can be performed has changed to a state where the loading function cannot be performed. The work management section 54 can acquire the time point at which the transportation vehicle 3 has separated from the loading machine 2 based on the intensity of the radio waves received by the reception section 51 and can generate the separation time-point data indicating the time point at which the transportation vehicle 3 has separated from the loading machine 2. In the present embodiment, the separation time-point data includes transportation function start time-point data indicating a time point at which the transportation function has started after the separation of the transportation vehicle 3 from the loading machine 2 after completion of the loading function.

A time period from the time point at which a state where the loading function for a certain transportation vehicle 3 cannot be performed has changed to a state where the loading function can be performed to a time point at which a state where the loading function cannot be performed is reached once again includes a time period during which the loading function for the transportation vehicle 3 is performed. The work management section 54 can generate loading function period data indicating the time period during which the loading function for the transportation vehicle 3 is performed based on the intensity of the radio waves received by the reception section 51.

A time period from the time point at which a state where the loading function for a certain transportation vehicle 3 can be performed has changed to a state where the loading function cannot be performed to a time point at which a state where the loading function can be performed is reached once again includes a time period during which the transportation vehicle 3 performs the transportation function. The work management section 54 can generate transportation function period data indicating the time period during which the transportation vehicle 3 performs the transportation function based on the intensity of the radio waves received by the reception section 51.

Further, the work management section 54 can count the number of times that the transportation vehicle 3 has approached the loading machine 2 based on the intensity of the radio waves received by the reception section 51 and can generate the approach frequency data indicating the number of times that the transportation vehicle 3 has approached the loading machine 2. The number of times that the transportation vehicle 3 has approached the loading machine 2 includes the number of times that the loading function for the transportation vehicle 3 has been performed. The work management section 54 can generate loading function frequency data indicating the number of times that the loading function for the transportation vehicle 3 has been performed based on the intensity of the radio waves received by the reception section 51.

Further, the work management section 54 can count the number of times that the transportation vehicle 3 has separated from the loading machine 2 based on the intensity of the radio waves received by the reception section 51 and can generate the separation frequency data indicating the number of times that the transportation vehicle 3 has separated from the loading machine 2. The number of times that the transportation vehicle 3 has separated from the loading machine 2 includes the number of times that the transportation vehicle 3 has performed the transportation function. The work management section 54 can generate transportation function frequency data indicating the number of times that the transportation vehicle 3 has performed the transportation function based on the intensity of the radio waves received by the reception section 51.

The work management section 54 can generate, for each of the plurality of transportation vehicles 3, the approach time-point data including the loading function start time-point data, the separation time-point data including the transportation function start time-point data, loading function period data, transportation function period data, approach frequency data including the loading function frequency data, and separation frequency data including the number of transportation functions.

Figure 7:
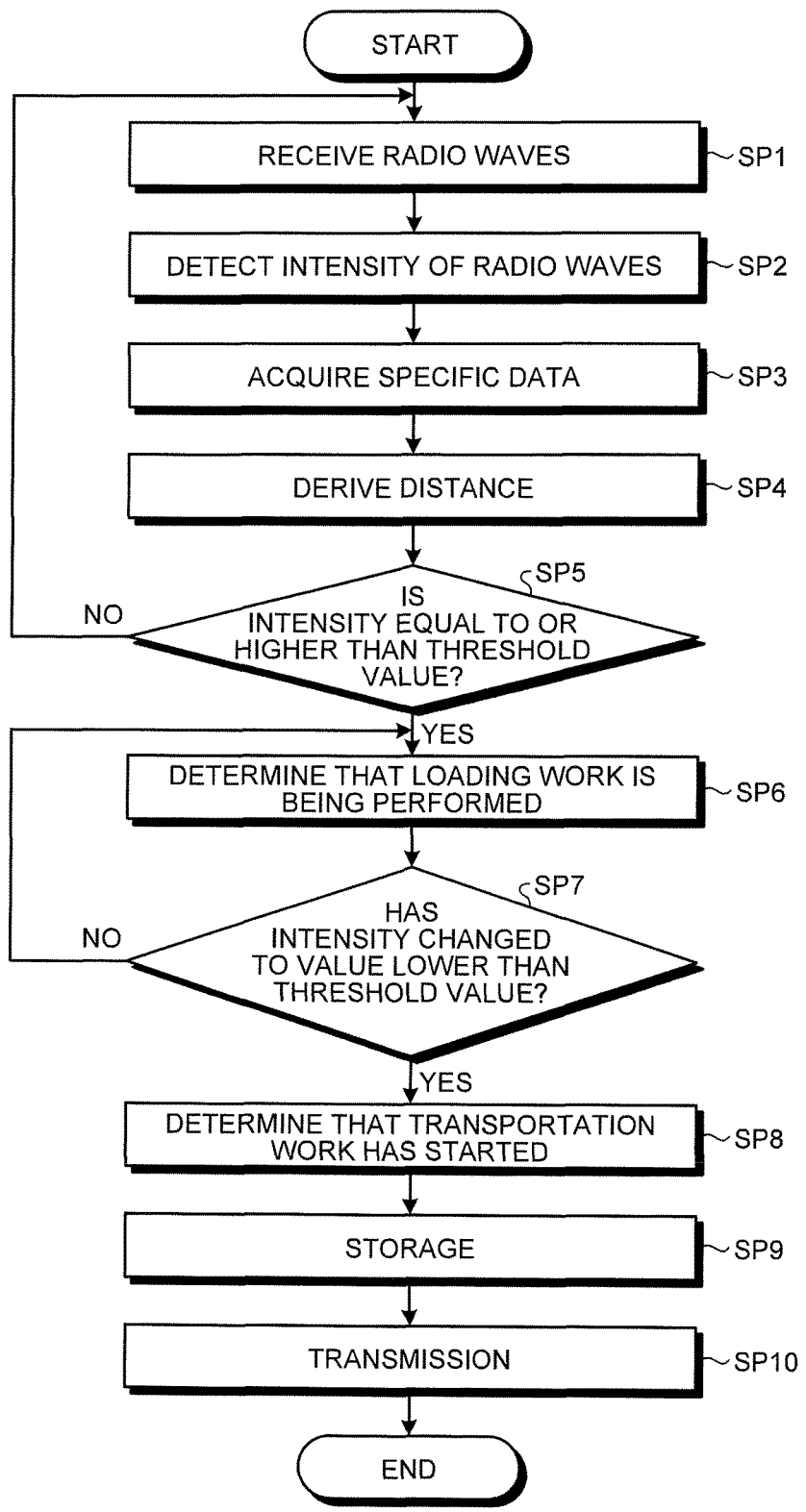
FIG. 7 is a flowchart illustrating an example of a construction management method according to the first embodiment.

The following describes, with reference to FIG. 7, an example of a method that performs construction management at the construction site CS using the construction management system 1 according to the present embodiment. FIG. 7 is a flowchart illustrating an example of a construction management method according to the present embodiment.

At the construction site CS, the operator Ma carrying the mobile terminal 5 is occupying the operation room of the loading machine 2. For the loading function, the transportation vehicle 3 approaches the loading machine 2 existing at the construction site CS. The transmitter 4 provided in the transportation vehicle 3 transmits radio waves including specific data of the transportation vehicle 3. The reception section 51 of the mobile terminal 5 receives the radio waves transmitted from the transmitter 4 (step SP1).

The detection section 52 of the mobile terminal 5 detects the intensity of the radio waves received by the reception section 51 (step SP2).

The specific data acquisition section 53 of the mobile terminal 5 acquires the specific data of the transportation vehicle 3 from the radio waves received by the reception section 51 (step SP3).

The distance derivation section 55 of the mobile terminal 5 derives the distance between the loading machine 2 and transportation vehicle 3 based on the intensity of the radio waves detected by the detection section 52 and the first correlation data stored in the storage section 56 of the mobile terminal 5 (step SP4).

The work management section 54 of the mobile terminal 5 estimates the distance between the loading machine 2 and transportation vehicle 3 based on the intensity of the radio waves detected by the detection section 52. In the present embodiment, the work management section 54 acquires the distance between the loading machine 2 and transportation vehicle 3 from the distance derivation section 55.

The work management section 54 determines whether or not the intensity of the radio waves detected by the detection section 52 is equal to or higher than a predetermined threshold value (step SP5).

When it is determined in step SP5 that the intensity of the radio waves is not equal to or higher than the threshold value (No in step SP5), reception of the radio waves by the reception section 51 is continued (step SP1).

When it is determined in step SP5 that the intensity of the radio waves is equal to or higher than the threshold value (Yes in step SP5), the work management section 54 determines that the loading machine 2 is performing the loading function of loading cargo onto the transportation vehicle 3 (step SP6). For example, the loading function is performed by an excavator as the loading machine 2, the cargo is loaded onto the transportation vehicle 3 while an upper swinging body of the excavator swings. That is, in such a case, the loading function is performed in the following procedures: the upper swinging body of the excavator is swung toward a place where earth and sand as the cargo is piled up; the earth and sand is scooped up by a scoop that a work machine of the excavator has; the upper swinging body is swung toward the transportation vehicle 3 side; the earth and sand in the scoop is discharged to a vessel of the transportation vehicle 3 when the scoop is moved above the vessel; and the upper swinging body is swung once again toward the place where earth and sand is piled up. Such procedures are repeated required number of times. That is, the relative distance between the mobile terminal 5 disposed in the loading machine 2 and the transmitter 4 mounted in the loading machine 2 varies with an operation accompanying the loading function of the loading machine 2 during the loading function. Thus, even when the intensity of the radio waves changes from a value equal to or higher than the threshold value to a value lower than the threshold value in step SP5 or in step SP7 to be described later, it may be determined that the loading function is continued when this change is temporary and lasts for a short time (Yes in step SP5, Yes in step SP7).

The work management section 54 determines whether the intensity of the radio waves detected by the detection section 52 has changed from a value equal to or higher than the threshold value to a value lower than the threshold value (step SP7).

When it is determined in step SP7 that the intensity of the radio waves has not changed from a value equal to or higher than the threshold value to a value lower than the threshold value (No in step SP7), the work management section 54 determines that the relative distance between the loading machine 2 and transportation vehicle 3 is maintained at a distance at which the loading function can be performed and determines that the loading function is continued (step SP6).

When it is determined in step SP7 that the intensity of the radio waves has changed from a value equal to or higher than the threshold value to a value lower than the threshold value (Yes in step SP7), the work management section 54 determines that the relative distance between the loading machine 2 and transportation vehicle 3 is a distance at which the loading function cannot be performed and determines that the transportation function of the transportation vehicle 3 transporting the cargo has started after completion of the loading function (step SP8).

The result data, including the approach time-point data, separation time-point data, and approach frequency data, generated by the work management section 54 is stored in the storage section 56 of the mobile terminal 5 (step SP9).

As described above, the certain transportation vehicle 3 approaches the loading machine 2, then the loading function is performed and, thereafter, the transportation function is performed. As described above, at the construction site CS, the plurality of transportation vehicles 3 are operated. The transmitter 4 mounted in each of the plurality of transportation vehicles 3 transmits the specific data of the transportation vehicle 3 in which the transmitter 4 is mounted. The transmitter 4 mounted in a first transportation vehicle 3 transmits radio waves including the specific data of the first transportation vehicle 3. The transmitter 4 mounted in a second transportation vehicle 3 transmits radio waves including the specific data of the second transportation vehicle 3. The work management section 54 of the mobile terminal 5 extracts the specific data of the first transportation vehicle 3 from the radio waves transmitted from the transmitter 4 mounted in the first transportation vehicle 3. The work management section 54 of the mobile terminal 5 extracts the specific data of the second transportation vehicle 3 from the radio waves transmitted from the transmitter 4 mounted in the second transportation vehicle 3. The mobile terminal 5 generates the result data for each of the plurality of transportation vehicles 3.

In the present embodiment, after a predetermined amount of the result data is stored in the storage section 56, the result data of the storage section 56 is transmitted to the server 6 via the transmission section 57 of the mobile terminal 5 (step SP10).

The communication section 61 of the server 6 acquires the result data supplied from the mobile terminal 5. The server 6 stores the result data in the storage section 62. The display section 63 displays the result data on a display connected to the server 6.

Figures 8, 9:
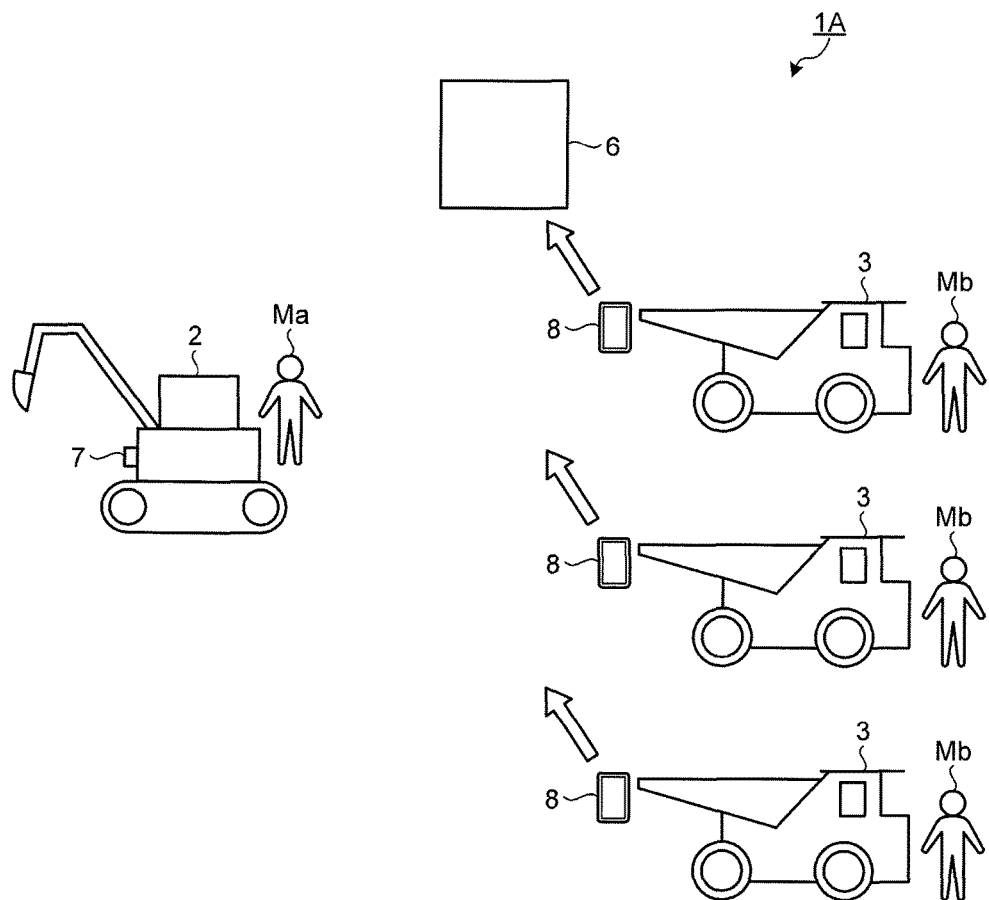
FIG. 8 is a view illustrating an example of the construction management system according to the first embodiment.
FIG. 9 is a view illustrating an example of a construction management system according to a second embodiment.

FIG. 8 is a view illustrating an example of the result data displayed, by the display section 63, on the display connected to the server 6. The result data illustrated in FIG. 8 may be displayed on a display of the mobile terminal 5.

The result data is displayed in association with the specific data of the transportation vehicle 3. In the example illustrated in FIG. 8, the approach time-point data and separation time-point data, which are the result data, are displayed in association with the specific data, more specifically, a plurality of transportation vehicle identification data (transportation vehicle No. 01, transportation vehicle No. 02, transportation vehicle No. 03) for specifying the transportation vehicle 3 and a plurality of operator identification data (operator A, operator B, operator C) for specifying the operator Mb who operates the transportation vehicle 3.

As described above, the specific data of the transportation vehicle 3 includes not only the transportation vehicle identification data and operator identification data but also the maximum load data indicating a maximum load of the transportation vehicle 3. The result data includes not only the approach time-point data and separation time-point data, but also the approach frequency data and separation frequency data. The approach frequency data includes the loading function frequency data, and the separation frequency data includes the transportation function frequency data. The above specific data may be displayed in association with the result data. For example, a total amount of the cargo transported from the construction site CS may be calculated based on the maximum load data and at least one of the approach frequency data and separation frequency data for display on the display.

Further, as described above, the result data includes the loading function start time-point data, transportation function start time-point data, loading function period data, and transportation function period data. The above result data may be associated with the specific data of the transportation vehicle 3 for display.

As described above, according to the present embodiment, the radio waves including the specific data of the transportation vehicle 3 is transmitted from the transmitter 4, and the mobile terminal 5 detects the intensity of the radio waves and acquires the specific data included in the radio waves. The result data indicating that the transportation vehicle 3 has approached the loading machine 2 is generated based on the intensity of the radio waves and specific data, so that it is possible to accurately grasp a status of the loading and transportation functions.

According to the present embodiment, based on the intensity of the radio waves and specific data, it is possible to specify the transportation vehicle 3 for which the loading function is performed from among a plurality of transportation vehicles 3 operated at the construction site CS. Further, the result data including at least one of the approach time-point data indicating the time point at which a certain transportation vehicle 3 has approached the loading machine 2, the separation time-point data indicating the time point at which the transportation vehicle 3 has separated from the loading machine 2, and the approach frequency data indicating the number of times that the transportation vehicle 3 has approached the loading machine 2 is generated.

The approach time point indicated by the approach time-point data is regarded as the loading function start time point at which the loading function has started after the approach of a certain transportation vehicle 3 to the loading machine 2. Thus, generating the approach time-point data allows the time point at which the loading function is performed for the certain transportation vehicle 3 to be specified. Generating the approach time-point data for each of the plurality of transportation vehicles 3 allows the time point at which the loading function is performed for each of the plurality of transportation vehicles 3 to be specified. That is, it is possible to grasp when the loading function has been performed for which one of the plurality of transportation vehicles 3. Further, it is possible to grasp a time required for completing the loading function for the certain transportation vehicle 3 based on the loading function period data.

The separation time point indicated by the separation time-point data is regarded as the transportation function start time point at which the transportation function has started after the separation of a certain transportation vehicle 3 from the loading machine 2. Thus, generating the separation time-point data allows the time point at which the certain transportation vehicle 3 performs the transportation function to be specified. Generating the separation time-point data for each of the plurality of transportation vehicles 3 allows the time point at which each of the plurality of transportation vehicles 3 performs the transportation function to be specified. That is, it is possible to grasp when which one of the plurality of transportation vehicles 3 has performed the transportation function. Further, it is possible to grasp a time required for the certain transportation vehicle 3 to complete the transportation function based on the transportation function period data.

Further, by the approach frequency data or separation frequency data, it is possible to grasp the number of times of the loading function or transportation function performed for/by the certain transportation vehicle 3. The specific data includes the maximum load data indicating a maximum load of the transportation vehicle 3. Thus, based on the maximum load data and at least one of the approach frequency data and separation frequency data, a total amount of the cargo transported from the construction site CS by the certain transportation vehicle 3 can be grasped. That is, it is possible to grasp how much amount of the cargo has been transported from the construction site CS by which one of the plurality of transportation vehicles 3. Further, by generating the approach frequency data or separation frequency data for each of the plurality of transportation vehicles 3, it is possible to grasp a total amount of the cargo transported from the construction site CS by the plurality of transportation vehicles 3. The maximum load data of each transportation vehicle amount 3 may be stored in the storage section 62 of the server 6. In this case, the total amount of the cargo transported from the construction site CS may be calculated by using at least one of the approach frequency data or separation frequency data of the certain transportation vehicle 3 acquired by the server 6 and the maximum load data stored in the storage section 62.

As described above, a work amount of each of the plurality of transportation vehicles 3 can be grasped, so that it is possible to take measures for improving work efficiency at the construction site CS. For example, when a time interval during which the transportation vehicle 3 approaches a first loading machine 2 is large while a time interval during which the transportation vehicle 3 approaches a second loading machine 2 is small, it can be understand that the work efficiency of the first loading machine 2 is low. In this case, in order to improve the work efficiency of the first loading machine 2, it is possible to take measures of reexamining allocation of the transportation vehicle 3. Further, it is possible to take measures of accelerating improvement for the transportation vehicle 3 having an excessively small approach frequency.

In the present embodiment, based on the maximum load data of the transportation vehicle 3 and the approach frequency data (loading function frequency data) or separation frequency data (transportation function frequency data) for the transportation vehicle 3, the total amount of the cargo transported from the construction site CS by the transportation vehicle 3 is calculated. For example, a sensor called payload meter that can detect the load amount of the cargo loaded onto the transportation vehicle 3 may be used to detect the load amount of the cargo for the transportation vehicle 3. A communication device, which is different from the transmission section 41 and reception section 51 and capable of communicating with both the transportation vehicle 3 and mobile terminal 5 may be used to transmit a detection value of the payload meter to the mobile terminal 5.

In the above embodiment, the work management section 54 is provided in the mobile terminal 5. The function of the work management section 54 may be provided in the server 6, and function of the distance derivation section 55 may be provided in the server 6. Intensity data indicating the intensity of the radio waves detected by the detection section 52 of the mobile terminal 5 and specific data acquired by the specific data acquisition section 53 of the mobile terminal 5, which are obtained after the radio waves has been received by the reception section 51 of the mobile terminal 5, may be transmitted by radio to the communication section 61 of the server 6 via the transmission section 57. The work management section 54 of the server 6 can generate the result data based on the intensity data and specific data received by the communication section 61. Further, the server 6 can display the generated result data and specific data on a display connected thereto in association with each other. When the intensity data and specific data received by the reception section 51 of the mobile terminal 5 is transmitted in real time from the transmission section 57 to the communication section 61, a time point at which the intensity data and specific data have been transmitted from the transmission section 57 or a time point at which the intensity data and specific data have been received by the communication section 61 may be regarded as the time point at which the transportation vehicle 3 has approached the loading machine 2 or time point at which the transportation vehicle 3 has separated from the loading machine 2. The same is applied to the following embodiments.

Second Embodiment

A second embodiment will be described. In the following description, the same reference numerals are given to the same or similar constituent elements to those of the above-described embodiment, and thus the description thereof will be simplified or omitted.

In the present embodiment, a transmitter 7 is disposed in a loading machine 2, and a mobile terminal 8 is disposed in a transportation vehicle 3.

FIG. 9 is an exemplary view illustrating an example of a construction management system 1A according to the present embodiment. As illustrated in FIG. 9, the transmitter 7 including a beacon terminal is disposed in the loading machine 2. The transmitter 7 transmits radio waves including specific data of the loading machine 2.

The mobile terminal 8 is carried by an operator Mb who operates the transportation vehicle 3. The operator Mb carrying the mobile terminal 8 is occupying an operation room of the transportation vehicle 3, whereby the mobile terminal 8 is disposed in the transportation vehicle 3. The mobile terminal 8 can communicate with the server 6 by radio.

Figure 10:
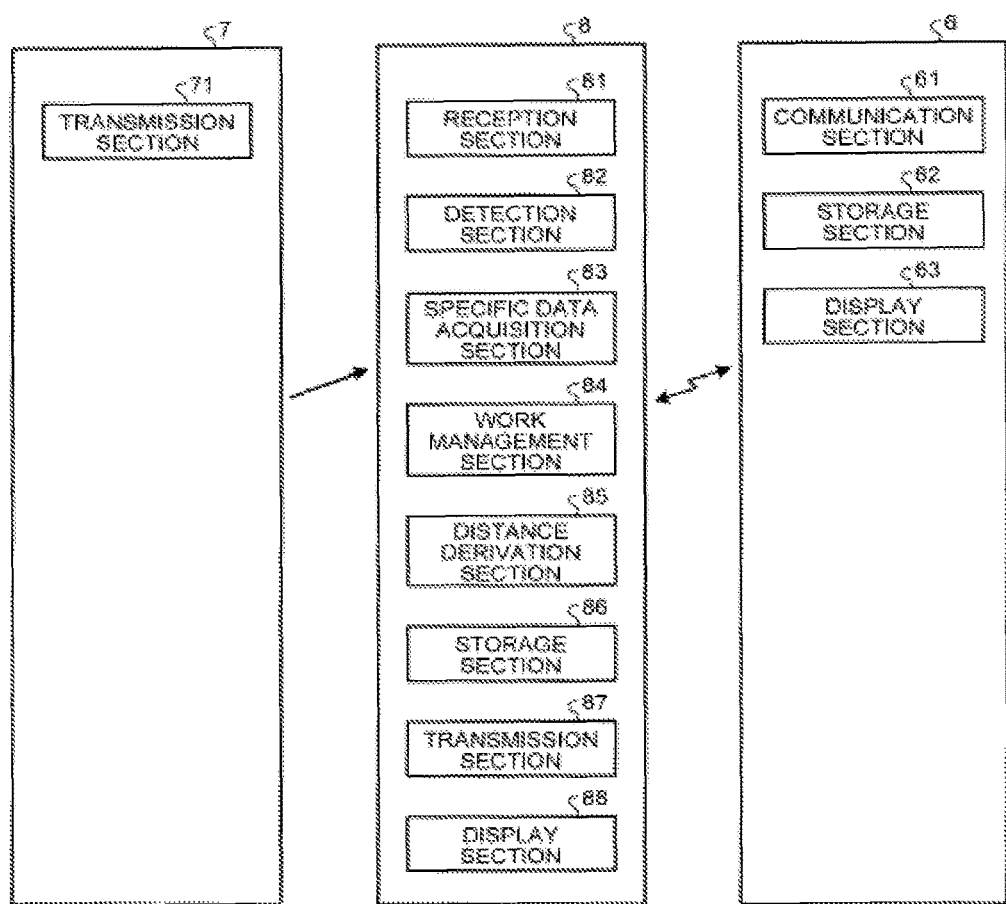
FIG. 10 is a functional block diagram illustrating an example of the construction management system according to the second embodiment.

FIG. 10 is a functional block diagram illustrating an example of the construction management system 1A according to the present embodiment. As illustrated in FIG. 10, the transmitter 7 has a transmission section 71. The transmission section 71 has the same function as that of the transmission section 41 described in the above-described embodiment, and the description thereof will be omitted.

The mobile terminal 8 has a reception section 81, a detection section 82, a specific data acquisition section 83, a work management section 84, a distance derivation section 85, a storage section 86, a transmission section 87, and a display section 88.

The reception section 81 receives the radio waves from the transmission section 71 of the transmitter 7. The detection section 82 detects intensity of the radio waves received by the reception section 81. The specific data acquisition section 83 acquires the specific data of the loading machine 2 from the radio waves received by the reception section 81. The work management section 84 generates result data indicating that the loading machine 2 has approached the transportation vehicle 3 based on the intensity of the radio waves detected by the detection section 82 and specific data acquired by the specific data acquisition section 83. The distance derivation section 85 derives a distance between the loading machine 2 and transportation vehicle 3 based on the intensity of the radio waves detected by the detection section 82. The storage section 86 stores the result data generated by the work management section 84. The transmission section 87 transmits the result data of the storage section 86 to the communication section 61 of the server 6 by radio. The display section 88 displays image data on a display provided in the mobile terminal 8.

The reception section 81, the detection section 82, the specific data acquisition section 83, the work management section 84, the distance derivation section 85, the storage section 86, the transmission section 87, and the display section 88 have the same functions as those of the reception section 51, the detection section 52, the specific data acquisition section 53, the work management section 54, the distance derivation section 55, the storage section 56, the transmission section 57, and the display section 58 described in the above-described embodiment, and thus the description thereof will be simplified or omitted.

The server 6 has the communication section 61, a storage section 62, and a display section 63. The server 6 has the same function as that of the server 6 described in the above-described first embodiment, and thus the description thereof will be omitted.

The result data generated by the work management section 84 includes at least one of approach time-point data indicating a time point at which the loading machine 2 has approached the transportation vehicle 3, separation time-point data indicating a time point at which the loading machine 2 has separated from the transportation vehicle 3, and approach frequency data indicating the number of times that the loading machine 2 has approached the transportation vehicle 3.

The specific data of the loading machine 2 includes at least one of loading machine identification data for specifying the loading machine 2 and operator identification data indicating an operator Ma who operates the loading machine 2.

Figure 11:
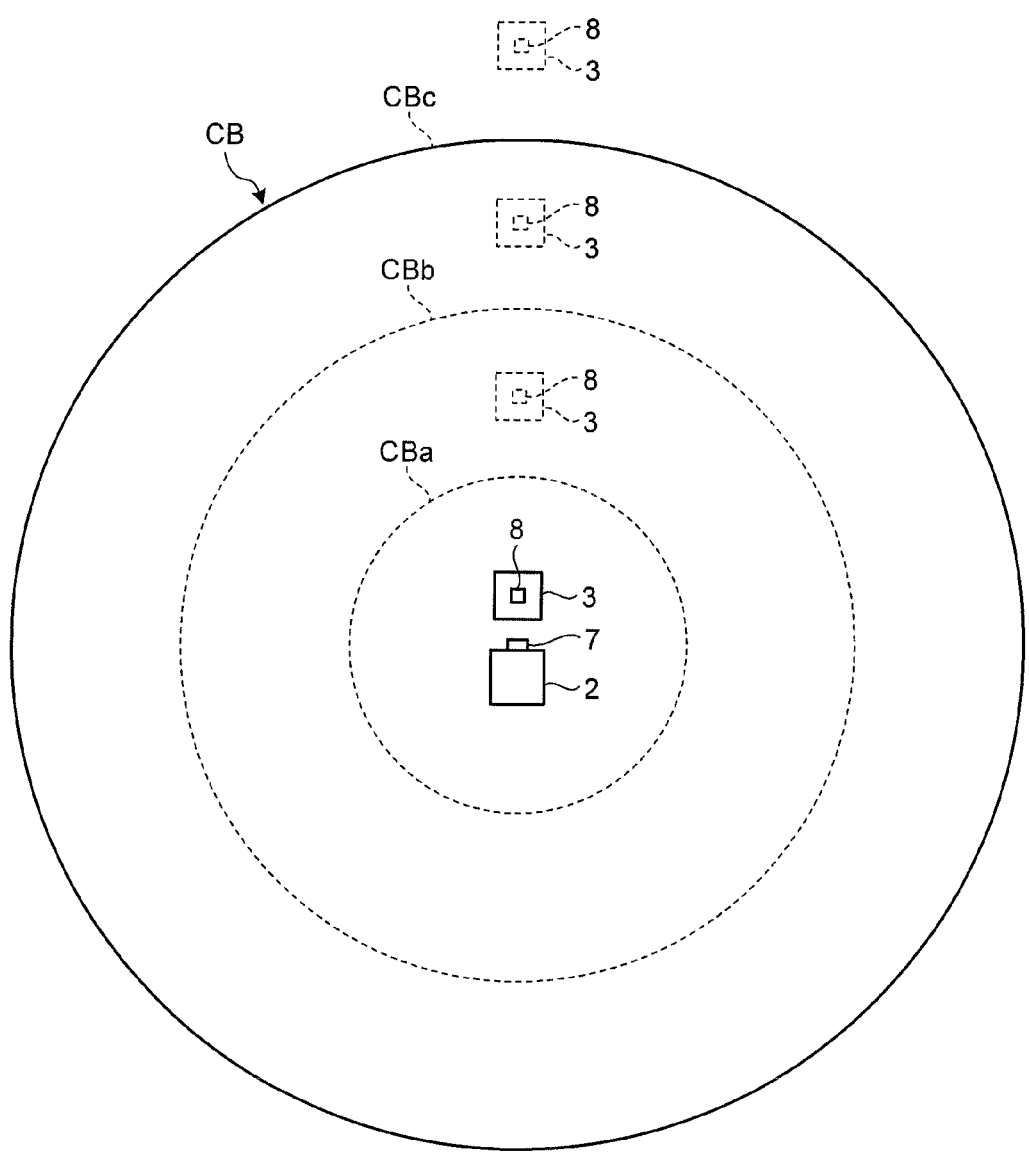
FIG. 11 is an exemplary view illustrating an example of a construction management method according to the second embodiment.

FIG. 11 is an exemplary view illustrating an example of a relationship between the loading machine 2 and transportation vehicle 3. As illustrated in FIG. 11, the transmitter 7 has a communication area CB. When the transportation vehicle 3 exists in the communication area CB, the reception section 81 of the mobile terminal 8 disposed in the transportation vehicle 3 can receive the radio waves from the transmitter 7. The loading function is performed in a state where both the loading machine 2 and transportation vehicle 3 exist in the communication area CB.

The distance derivation section 85 sets, within the communication area CB, a fourth area CBa over which the radio waves from the transmitter 7 can be received at a fourth intensity, a fifth area CBb over which the radio waves from the transmitter 7 can be received at a fifth intensity lower than the fourth intensity, and a sixth area CBc over which the radio waves from the transmitter 7 can be received at a sixth intensity lower than the fifth intensity. The fourth area CBa is set so as to include a mounting position of the transmitter 7. The fifth area CBb is set around the fourth area CBa. The sixth area CBc is set around the fifth area CBb. When the mobile terminal 8 exists in the fourth area CBa, the reception section 81 of the mobile terminal 8 receives the radio waves of the fourth intensity. When the mobile terminal 8 exists in the fifth area CBb, the reception section 81 of the mobile terminal 8 receives the radio waves of the fifth intensity. When the mobile terminal 8 exists in the sixth area CBc, the reception section 81 of the mobile terminal 8 receives the radio waves of the sixth intensity. The distance derivation section 85 specifies, from among the fourth, fifth, and sixth areas CBa, CBb, and CBc, the area where the mobile terminal 8 exists based on the intensity of the radio waves received by the reception section 81.

If the loading machine 2 and transportation vehicle 3 separate from each other, the loading function is difficult to perform even when both the loading machine 2 and transportation vehicle 3 exists in the communication area CB. When a relative distance between the loading machine 2 and transportation vehicle 3 is equal to or smaller than a predetermined distance, the loading machine 2 and transportation vehicle 3 can perform the loading function. That is, when the loading machine 2 and transportation vehicle 3 approach each other within a predetermined distance or less, the loading machine 2 and transportation vehicle 3 can perform the loading function.

When the relative distance between the loading machine 2 and transportation vehicle 3 is equal to or smaller than a predetermined distance, the intensity of the radio waves received by the reception section 81 is equal to or higher than a threshold value. The work management section 84 determines that the loading machine 2 and transportation vehicle 3 can perform the loading function when the intensity of the radio waves received by the reception section 81 is equal to or higher than the threshold value.

When the relative distance between the loading machine 2 and transportation vehicle 3 is larger than the predetermined distance, the intensity of the radio waves received by the reception section 81 is lower than the threshold value. The work management section 84 can determine that the loading machine 2 and transportation vehicle 3 cannot perform the loading function when the intensity of the radio waves received by the reception section 81 is lower than the threshold value.

Second correlation data indicating a relationship between the relative distance between the loading machine 2 and transportation vehicle 3 within which the loading function can be performed and the intensity of the radio waves which are transmitted from the transmission section 71 and received by the reception section 81 at the relative distance is previously obtained. The second correlation data is previously obtained by experiments or simulations. The second correlation data is stored in the storage section 86.

The work management section 84 determines, based on the intensity of the radio waves detected by the detection section 82 and second correlation data stored in the storage section 86, whether or not the relative distance between the loading machine 2 and transportation vehicle 3 is a distance at which the loading function can be performed.

In the present embodiment, the fourth area CBa is a loading function executable area where the loading function can be performed. When both the transportation vehicle 3 and loading machine 2 exist in the fourth area CBa, the transportation vehicle 3 and loading machine 2 can perform the loading function. When the transportation vehicle 3 exists in the fourth area CBa, the intensity of the radio waves received by the reception section 81 of the mobile terminal 8 disposed in the transportation vehicle 3 is equal to or higher than the threshold value. When the transportation vehicle 3 exists outside the fourth area CBa, the transportation vehicle 3 and loading machine 2 cannot perform the loading function. When the transportation vehicle 3 exists outside the fourth area CBa, the intensity of the radio waves received by the reception section 81 of the mobile terminal 8 disposed in the transportation vehicle 3 is lower than the threshold value.

When the intensity of the radio waves received by the reception section 81 has changed from a value lower than the threshold value to a value equal to or higher than the threshold value, the work management section 84 determines that the relative distance between the loading machine 2 and transportation vehicle 3 has changed from a distance at which the loading function cannot be performed to a distance at which the loading function can be performed and thus determines that the loading function of the loading machine 2 loading cargo onto the transportation vehicle 3 has started.

When the intensity of the radio waves received by the reception section 81 is equal to or higher than the threshold value, the work management section 84 determines that the loading function of the loading machine 2 loading cargo onto the transportation vehicle 3 is being performed. In the present embodiment, when the work management section 84 determines that a time period during which the intensity of the radio waves received by the reception section 81 is maintained at a value equal to or higher than the threshold value has exceeded a predetermined time period, it determines that the loading function is being performed.

When the intensity of the radio waves received by the reception section 81 has changed from a value equal to or higher than the threshold value to a value lower than the threshold value, the work management section 84 determines that the relative distance between the loading machine 2 and transportation vehicle 3 has changed from a distance at which the loading function can be performed to a distance at which the loading function cannot be performed and thus determines that a transportation function of the transportation vehicle 3 transporting cargo has stared.

A time point at which the intensity of the radio waves received by the reception section 81 has changed from a value lower than the threshold value to a value equal to or higher than the threshold value includes a time point at which a state where the transportation vehicle 3 separates from the loading machine 2 has changed to a state where it approaches the loading machine 2 and a time point at which a state where the loading function cannot be performed has changed to a state where the loading function can be performed. The work management section 84 can acquire the time point at which the transportation vehicle 3 has approached the loading machine 2 based on the intensity of the radio waves received by the reception section 81 and can generate the approach time-point data indicating the time point at which the transportation vehicle 3 has approached the loading machine 2. The approach time-point data includes loading function start time-point data indicating a time point at which the loading function has started after the approach of the transportation vehicle 3 to the loading machine 2.

A time point at which the intensity of the radio waves received by the reception section 81 has changed from a value equal to or higher than the threshold value to a value lower than the threshold value includes a time point at which a state where the transportation vehicle 3 approaches the loading machine 2 has changed to a state where it separates from the loading machine 2 and a time point at which a state where the loading function can be performed has changed to a state where the loading function cannot be performed. The work management section 84 can acquire the time point at which the transportation vehicle 3 has separated from the loading machine 2 based on the intensity of the radio waves received by the reception section 81 and can generate the separation time-point data indicating the time point at which the transportation vehicle 3 has separated from the loading machine 2. The separation time-point data includes transportation function start time-point data indicating a time point at which the transportation function has started after the separation of the transportation vehicle 3 from the loading machine 2 after completion of the loading function.

A time period from the time point at which a state where the loading function of a certain loading machine 2 cannot be performed has changed to a state where the loading function can be performed to a time point at which a state where the loading function cannot be performed is reached once again includes a time period during which the loading function of the loading machine 2 is performed. The work management section 84 can generate loading function period data indicating the time period during which the loading function of the loading machine 2 is performed based on the intensity of the radio waves received by the reception section 81.

A time period from the time point at which a state where the loading function of a certain loading machine 2 can be performed has changed to a state where the loading function cannot be performed to a time point at which a state where the loading function can be performed is reached once again includes a time period during which the transportation vehicle 3 performs the transportation function. The work management section 84 can generate transportation function period data indicating the time period during which the transportation vehicle 3 performs the transportation function based on the intensity of the radio waves received by the reception section 81.

Further, the work management section 84 can count the number of times that the transportation vehicle 3 has approached the loading machine 2 based on the intensity of the radio waves received by the reception section 81 and can generate the approach frequency data indicating the number of times that the transportation vehicle 3 has approached the loading machine 2. The number of times that the transportation vehicle 3 has approached the loading machine 2 includes the number of times that the loading function for the transportation vehicle 3 has been performed. The work management section 84 can generate loading function frequency data indicating the number of times that the loading function for the transportation vehicle 3 has been performed based on the intensity of the radio waves received by the reception section 81.

Further, the work management section 84 can count the number of times that the transportation vehicle 3 has separated from the loading machine 2 based on the intensity of the radio waves received by the reception section 81 and can generate the separation frequency data indicating the number of times that the transportation vehicle 3 has separated from the loading machine 2. The number of times that the transportation vehicle 3 has separated from the loading machine 2 includes the number of times that the transportation vehicle 3 has performed the transportation function. The work management section 84 can generate transportation function frequency data indicating the number of times that the transportation vehicle 3 has performed the transportation function based on the intensity of the radio waves received by the reception section 81.

When a plurality of loading machines 2 exist at the construction site CS, the work management section 84 can generate, for each of the plurality of loading machines 2, the approach time-point data including the loading function start time-point data, the separation time-point data including the transportation function start time-point data, loading function period data, transportation function period data, approach frequency data including the loading function frequency data, and separation frequency data including the transportation function frequency data.

The following describes an example of a construction management method that uses the construction management system 1A according to the present embodiment.

At the construction site CS, the operator Mb carrying the mobile terminal 8 is occupying the operation room of the transportation vehicle 3. For the loading function, the transportation vehicle 3 approaches the loading machine 2 existing at the construction site CS. The transmitter 7 provided in the loading machine 2 transmits radio waves including specific data of the loading machine 2. The reception section 81 of the mobile terminal 8 receives the radio waves transmitted from the transmitter 7.

The detection section 82 of the mobile terminal 8 detects the intensity of the radio waves received by the reception section 81. The work management section 84 of the mobile terminal 8 estimates the distance between the loading machine 2 and transportation vehicle 3 based on the intensity of the radio waves detected by the detection section 82.

The specific data acquisition section 83 of the mobile terminal 8 acquires the specific data of the loading machine 2 from the radio waves received by the reception section 81.

The distance derivation section 85 of the mobile terminal 8 derives the distance between the loading machine 2 and transportation vehicle 3 based on the intensity of the radio waves detected by the detection section 82 and the second correlation data stored in the storage section 86 of the mobile terminal 8.

The work management section 84 determines whether or not the intensity of the radio waves detected by the detection section 82 is equal to or higher than a predetermined threshold value. When it is determined that the intensity of the radio waves is equal to or higher than the threshold value, the work management section 84 determines that the loading machine 2 is performing the loading function of loading cargo onto the transportation vehicle 3.

The work management section 84 determines whether the intensity of the radio waves detected by the detection section 82 has changed from a value equal to or higher than the threshold value to a value lower than the threshold value. When it is determined that the intensity of the radio waves has not changed from a value equal to or higher than the threshold value to a value lower than the threshold value, the work management section 84 determines that the loading function is continued. When it is determined that the intensity of the radio waves has changed from a value equal to or higher than the threshold value to a value lower than the threshold value, the work management section 84 determines that the transportation function of the transportation vehicle 3 transporting the cargo has started.

The result data, including the approach time-point data, separation time-point data, and approach frequency data, generated by the work management section 84 is stored in the storage section 86 of the mobile terminal 8.

When the plurality of loading machines 2 are operated at the construction site CS, the transmitter 7 mounted in each of the plurality of loading machines 2 transmits the specific data of the loading machine 2 in which the transmitter 7 is mounted. The transmitter 7 mounted in a first loading machine 2 of the plurality of loading machines 2 transmits radio waves including the specific data of the first loading machine 2. The transmitter 7 mounted in a second loading machine 2 of the plurality of loading machines 2 transmits radio waves including the specific data of the second loading machine 2. The specific data acquisition section 83 of the mobile terminal 8 extracts the specific data of the first loading machine 2 from the radio waves transmitted from the transmitter 7 mounted in the first loading machine 2. The specific data acquisition section 83 of the mobile terminal 8 extracts the specific data of the second loading machine 2 from the radio waves transmitted from the transmitter 7 mounted in the second loading machine 2. The work management section 84 of the mobile terminal 8 can generate the result data for each of the plurality of loading machines 2.

After a predetermined amount of the result data is stored in the storage section 86, the result data of the storage section 86 is transmitted to the server 6 via the transmission section 87 of the mobile terminal 8.

The communication section 61 of the server 6 acquires the result data supplied from the mobile terminal 8. The server 6 stores the result data in the storage section 62. The display section 63 displays the result data on a display connected to the server 6.

The result data is displayed in association with the specific data of the loading machine 2. For example, the approach time-point data and separation time-point data, which are the result data, are displayed in association with the specific data, more specifically, a plurality of loading machine identification data for specifying the loading machine 2 and a plurality of operator identification data specifying the operator Ma who operates the loading machine 2.

As described above, according to the present embodiment, the radio waves including the specific data of the loading machine 2 is transmitted from the transmitter 7, and the mobile terminal 8 detects the intensity of the radio waves and acquires the specific data included in the radio waves. The result data indicating that the loading machine 2 has approached the transportation vehicle 3 is generated based on the intensity of the radio waves and specific data, so that it is possible to accurately grasp a status of the loading and transportation functions.

According to the present embodiment, based on the intensity of the radio waves and specific data, it is possible to specify the loading machine 2 that performs the loading function from among a plurality of loading machines 2 operated at the construction site CS. Further, the result data including at least one of the approach time-point data indicating the time point at which a specified loading machine 2 has approached the transportation vehicle 3, separation time-point data indicating the time point at which the loading machine 2 has separated from the transportation vehicle 3, and approach frequency data indicating the number of times that the loading machine 2 has approached the transportation vehicle 3 is generated.

The approach time point indicated by the approach time-point data is regarded as the loading function start time point at which the loading function has started after the approach of a certain loading machine 2 to the transportation vehicle 3. Thus, generating the approach time-point data allows the time point at which the loading function is performed by the certain loading machine 2 to be specified. Generating the approach time-point data for each of the plurality of loading machines 2 allows the time point at which the loading function is performed by each of the plurality of loading machines 2 to be specified. That is, it is possible to grasp when the loading function has been performed by which one of the plurality of loading machines 2. Further, it is possible to grasp a time required for the certain loading machine 2 to complete the loading function based on the loading function period data.

The separation time point indicated by the separation time-point data is regarded as a loading function end time point at which the loading function by the certain loading machine 2 has ended and as the transportation function start time point at which the transportation function of the transportation vehicle 3 has started after the separation of the transportation vehicle 3 from the certain loading machine 2. Thus, generating the separation time-point data allows the time point at which the loading function of the certain loading machine 2 has ended and time point at which the transportation function has performed to be specified. Generating the separation time-point data for each of the plurality of loading machines 2 allows the time point at which the loading function of each of the plurality of loading machines 2 has ended to be specified. That is, it is possible to grasp when which one of the plurality of loading machines 2 has ended the loading function. Further, it is possible to grasp a time required for the certain transportation vehicle 3 to complete the transportation function based on the transportation function period data.

Further, by the approach frequency data or separation frequency data, it is possible to grasp the number of times of the loading function performed by the certain loading machine 2 or transportation function performed by the certain transportation vehicle 3 onto which the cargo has been loaded by the certain loading machine 2. By generating the approach frequency data or separation frequency data for each of the plurality of loading machines 2, it is possible to grasp how much amount of the cargo has been transported from the construction site CS by the loading function performed by which one of the plurality of loading machines 2.

As described above, a work amount of each of the plurality of loading machines 2 can be grasped, so that it is possible to take measures for improving work efficiency at the construction site CS. For example, when a time required for the first loading machine 2 to complete the loading function is large while a time required for the second loading machine 2 to complete the loading function is small, it can be understand that the work efficiency of the first loading machine 2 is low. In this case, it is possible to take some measures to improve the work efficiency of the first loading machine 2.

In the above embodiment, the work management section 84 is provided in the mobile terminal 8. The function of the work management section 84 may be provided in the server 6, and function of the distance derivation section 85 may be provided in the server 6. The intensity data indicating the intensity of the radio waves detected by the detection section 82 of the mobile terminal 8 and specific data acquired by the specific data acquisition section 83 of the mobile terminal 8, which are obtained after the radio waves has been received by the reception section 81 of the mobile terminal 8, may be transmitted by radio to the communication section 61 of the server 6 via the transmission section 87. The work management section 84 of the server 6 can generate the result data based on the intensity data and specific data received by the communication section 61. Further, the server 6 can display the generated result data and specific data on a display connected thereto in association with each other. When the intensity data and specific data received by the reception section 81 of the mobile terminal 8 are transmitted in real time from the transmission section 87 to the communication section 61, a time point at which the intensity data and specific data have been transmitted from the transmission section 87 or a time point at which the intensity data and specific data have been received by the communication section 61 may be regarded as the time point at which the loading machine 2 has approached the transportation vehicle 3 or time point at which the loading machine 2 has separated from the transportation vehicle 3. The same is applied to the following embodiments.

Third Embodiment

A third embodiment will be described. In the following description, the same reference numerals are given to the same or similar constituent elements to those of the above-described embodiments, and thus the description thereof will be simplified or omitted.

Figure 12:
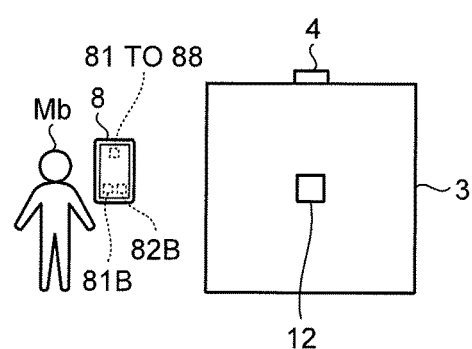
FIG. 12 is an exemplary view illustrating an example of a construction management method according to a third embodiment.

FIG. 12 is an exemplary view illustrating an example of a construction management system 1B that manages a loading machine 2 and a transportation vehicle 3 according to the present embodiment. As in the construction management system 1 described in the above-described first embodiment, the construction management system 1B has a transmitter 4 disposed in the transportation vehicle 3 and a mobile terminal 5 disposed in the loading machine 2. As in the above-described first embodiment, the mobile terminal 5 has a reception section 51, a detection section 52, a specific data acquisition section 53, a work management section 54, a distance derivation section 55, a storage section 56, a transmission section 57, and a display section 58.

In the present embodiment, the construction management system 1B has a transmitter 11 disposed in the loading machine 2 and configured to transmit radio waves, a reception section 51B disposed in the mobile terminal 5 and configured to receive the radio waves from the transmitter 11, and a detection section 52B disposed in the mobile terminal 5 and configured to detect intensity of the radio waves transmitted from the transmitter 11 and received by the reception section 51B.

The work management section 54 of the mobile terminal 5 determines, based on the intensity of the radio waves from the transmitter 11 which is detected by the detection section 52B, whether or not an operator Ma carrying the mobile terminal 5 is occupying the loading machine 2.

A communication area over which the radio waves transmitted from the transmitter 11 can be received is smaller than a communication area CA over which the radio waves transmitted from the transmitter 4 can be received. Intensity of the radio waves transmitted from the transmitter 11 is lower than that of the radio waves transmitted from the transmitter 4.

The transmitter 11 includes a beacon terminal. The reception section 51B of the mobile terminal 5 receives the radio waves from the transmitter 11 but does not receive the radio waves from the transmitter 4. The work management section 54 estimates a distance between the mobile terminal 5 and transmitter 11 based on the intensity of the radio waves from the transmitter 11 which is detected by the detection section 52B. When determining that the intensity of the radio waves detected by the detection section 52B is equal to or higher than a second threshold value, the work management section 54 determines that the operator Ma carrying the mobile terminal 5 is occupying an operation room of the loading machine 2. When determining that the intensity of the radio waves detected by the detection section 52B is lower than the second threshold value, the work management section 54 determines that the operator Ma carrying the mobile terminal 5 is not occupying the operation room of the loading machine 2.

In the present embodiment, whether or not the operator Ma carrying the mobile terminal 5 is occupying the operation room of the loading machine 2 is determined based on the intensity of the radio waves received by the reception section 51B. After it is determined that the operator Ma is occupying the operation room of the loading machine 2, the construction management method described using FIG. 7 is executed.

Further, in the present embodiment, the construction management system 1B has a transmitter 12 disposed in the transportation vehicle 3 and configured to transmit radio waves, a reception section 81B provided in the mobile terminal 8 carried by an operator Mb who operates the transportation vehicle 3 and configured to receive the radio waves from the transmitter 12, and a detection section 82B provided in the mobile terminal 8 and configured to detect the intensity of the radio waves received by the reception section 81B.

A work management section 84 of the mobile terminal 8 determines whether or not the operator Mb carrying the mobile terminal 8 is occupying an operation room of the transportation vehicle 3 based on the intensity of the radio waves detected by the detection section 82B.

A communication area over which the radio waves transmitted from the transmitter 12 can be received is smaller than a communication area CA over which the radio waves transmitted from the transmitter 4 can be received. The intensity of the radio waves transmitted from the transmitter 12 is lower than that of the radio waves transmitted from the transmitter 4.

The transmitter 12 includes a beacon terminal. The reception section 81B of the mobile terminal 8 receives the radio waves from the transmitter 12 but does not receive the radio waves from the transmitter 4. The work management section 84 estimates a distance between the mobile terminal 8 and transmitter 12 based on the intensity of the radio waves from the transmitter 12 which is detected by the detection section 82B. When determining that the intensity of the radio waves detected by the detection section 82B is equal to or higher than a third threshold value, the work management section 84 determines that the operator Mb carrying the mobile terminal 8 is occupying the operation room of the transportation vehicle 3. When determining that the intensity of the radio waves detected by the detection section 82B is lower than the third threshold value, the work management section 84 determines that the operator Mb carrying the mobile terminal 8 is not occupying the operation room of the transportation vehicle 3.

As described above, both the transmitter 4 that transmits the radio waves based on which a relative distance between the loading machine 2 and transportation vehicle 3 is derived and the transmitter 11 that transmits the radio waves based on which whether or not the operator Ma is occupying the operation room of the loading machine 2 is determined can be provided. Further, both the transmitter 4 that transmits the radio waves based on which a relative distance between the loading machine 2 and transportation vehicle 3 is derived and the transmitter 12 that transmits the radio waves based on which whether or not the operator Mb is occupying the operation room of the transportation vehicle 3 is determined can be provided.

Fourth Embodiment

A fourth embodiment will be described. In the following description, the same reference numerals are given to the same or similar constituent elements to those of the above-described embodiments, and thus the description thereof will be simplified or omitted.

Figure 13:
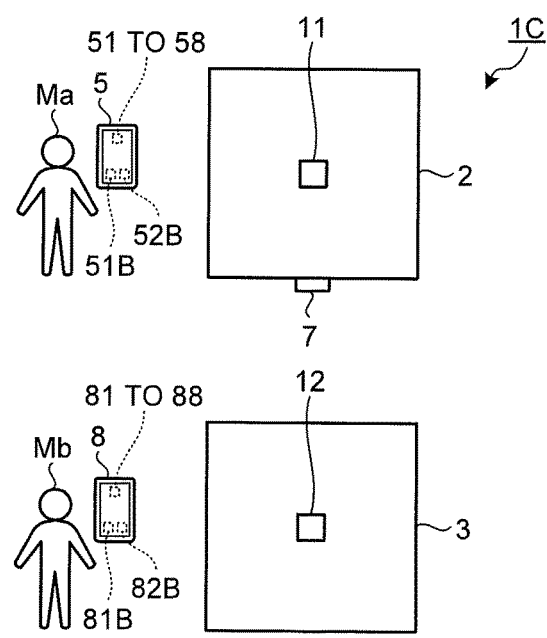
FIG. 13 is an exemplary view illustrating an example of a construction management method according to a fourth embodiment.

FIG. 13 is an exemplary view illustrating an example of a construction management system 1C that manages a loading machine 2 and a transportation vehicle 3 according to the present embodiment. As in the construction management system 1A described in the above-described second embodiment, the construction management system 1C has a transmitter 7 disposed in the loading machine 2 and a mobile terminal 8 disposed in the transportation vehicle 3. As in the above-described second embodiment, the mobile terminal 8 has a reception section 81, a detection section 82, a specific data acquisition section 83, a work management section 84, a distance derivation section 85, a storage section 86, a transmission section 87, and a display section 88.

In the present embodiment, the construction management system 1C has a transmitter 12 disposed in the transportation vehicle 3 and configured to transmit radio waves, a reception section 81B disposed in the mobile terminal 8 and configured to receive the radio waves from the transmitter 12, and a detection section 82B disposed in the mobile terminal 8 and configured to detect intensity of the radio waves transmitted from the transmitter 12 and received by the reception section 81B. The transmitter 12 includes a beacon terminal.

The work management section 84 of the mobile terminal 8 determines, based on the intensity of the radio waves from the transmitter 12 which is detected by the detection section 82B, whether or not an operator Mb carrying the mobile terminal 8 is occupying the transportation vehicle 3. After it is determined by the work management section 84 that the operator Mb is occupying an operation room of the transportation vehicle 3, the construction management method described in the second embodiment is executed.

Further, the construction management system 1C has a transmitter 11 disposed in the loading machine 2 and configured to transmit radio waves, a reception section 51B provided in the mobile terminal 5 carried by an operator Ma who operates the loading machine 2 and configured to receive the radio waves from the transmitter 11, and a detection section 52B provided in the mobile terminal 5 and configured to detect the intensity of the radio waves received by the reception section 51B.

A work management section 54 of the mobile terminal 5 determines whether or not the operator Ma carrying the mobile terminal 5 is occupying an operation room of the loading machine 2 based on the intensity of the radio waves detected by the detection section 52B.

As described above, both the transmitter 7 that transmits the radio waves based on which a relative distance between the loading machine 2 and transportation vehicle 3 is derived and the transmitter 12 that transmits the radio waves based on which whether or not the operator Mb is occupying the operation room of the transportation vehicle 3 is determined can be provided. Further, both the transmitter 7 that transmits the radio waves based on which a relative distance between the loading machine 2 and transportation vehicle 3 is derived and the transmitter 11 that transmits the radio waves based on which whether or not the operator Ma is occupying the operation room of the loading machine 2 is determined can be provided.

Fifth Embodiment

A fifth embodiment will be described. In the following description, the same reference numerals are given to the same or similar constituent elements to those of the above-described embodiments, and thus the description thereof will be simplified or omitted.

Figure 14:
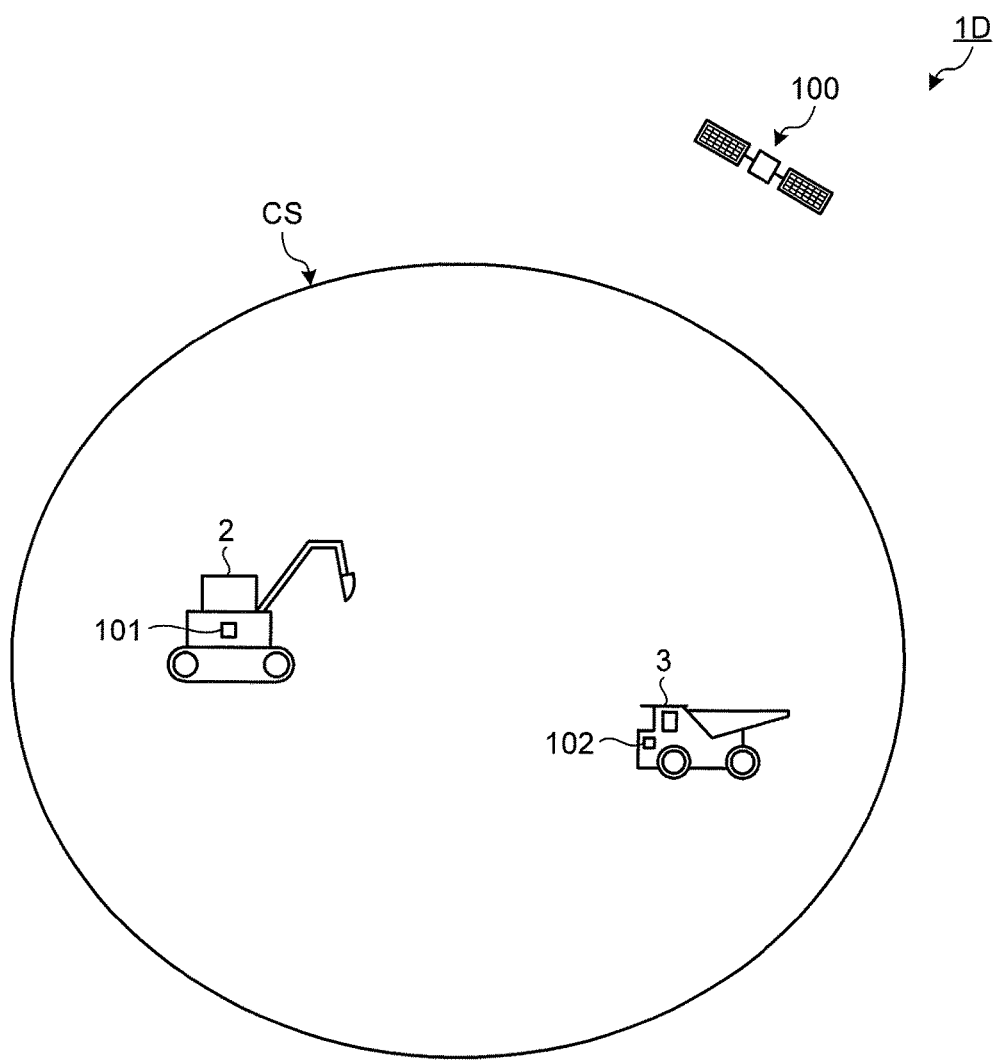
FIG. 14 is an exemplary view illustrating an example of a construction management method according to a fifth embodiment.

FIG. 14 is an exemplary view illustrating an example of a construction management system 1D that manages a loading machine 2 and a transportation vehicle 3 according to the present embodiment. In the present embodiment, the construction management system 1D has a position sensor 101 that detects an absolute position of the loading machine 2 and a position sensor 102 that detects an absolute position of the transportation vehicle 3. The position sensor 101 includes a GPS receiver provided in the loading machine 2. The position sensor 102 includes a GPS receiver provided in the transportation vehicle 3. The position sensor 101 receives radio waves from a GPS satellite 100 to detect the position of the loading machine 2 on a GPS coordinate system. The position sensor 102 receives radio waves from the GPS satellite 100 to detect the position of the transportation vehicle 3 on the GPS coordinate system.

The construction management system 1D outputs the absolute position of the loading machine 2 detected by the position sensor 101, the absolute position of the transportation vehicle 3 detected by the position sensor 102, and relative distance between the loading machine 2 and transportation vehicle 3 derived based on the radio waves transmitted from the transmitter 4 or transmitter 7, which has been described in the above-described embodiments in association with each other. For example, the construction management system 1D may derive the relative distance between the loading machine 2 and transportation vehicle 3 within which the loading function can be performed based on the radio waves transmitted from the transmitter 4 or transmitter 7 and derive the absolute positions of the respective loading machine 2 and transportation vehicle 3 at which the relative distance can be maintained based on detection results of the position sensors 101 and 102.

In the above-described first to fifth embodiments, the beacon terminal is used as a near-field radio communication device for deriving the relative distance between the loading machine 2 and transportation vehicle 3. As the near-field radio communication device, a device that performs radio communication according to Bluetooth (registered trademark) specification, or a device that performs radio communication according to ZigBee specification may be used.

In each of the above-described embodiments, the mobile terminal 5 or the mobile terminal 8 may communicate with the server 6 by radio or through a wired line. When the mobile terminal 5 or the mobile terminal 8 communicates with the server 6 by radio, a mobile phone network or a satellite communication may be used.

REFERENCE SIGNS LIST

1 Construction management system
1A Construction management system
1B Construction management system
1C Construction management system
1D Construction management system
2 Loading machine
3 Transportation vehicle
4 Transmitter
5 Mobile terminal
6 Server
7 Transmitter
8 Mobile terminal
11 Transmitter
12 Transmitter 41 Transmission section
51 Reception section
51B Reception section
52 Detection section
52B Detection section
53 Specific data acquisition section
54 Work management section
55 Distance derivation section
56 Storage section
57 Transmission section
58 Display section
61 Communication section
62 Storage section
63 Display section
71 Transmission section
81 Reception section
81B Reception section
82 Detection section
82B Detection section
83 Specific data acquisition section
84 Work management section
85 Distance derivation section
86 Storage section
87 Transmission section
88 Display section
100 GPS satellite
101 Position sensor
102 Position sensor
CA Communication area
CB Communication area
CS Construction site
Ma Operator
Mb Operator

The invention claimed is:

1. A construction management system comprising:
a transmitter disposed in a transportation vehicle and configured to transmit radio waves including specific data of the transportation vehicle;
a mobile terminal disposed in a loading machine;
a reception section provided in the mobile terminal and configured to receive the radio waves from the transmitter;
a detection section provided in the mobile terminal and configured to detect intensity of the radio waves received by the reception section;
a specific data acquisition section provided in the mobile terminal and configured to acquire the specific data from the radio waves received by the reception section; and
a work management section configured to generate result data indicating that the transportation vehicle has approached the loading machine based on the intensity detected by the detection section and the specific data acquired by the specific data acquisition section.

2. The construction management system according to claim 1, wherein
the result data includes at least one of approach time-point data indicating a time point at which the transportation vehicle has approached the loading machine, separation time-point data indicating a time point at which the transportation vehicle has separated from the loading machine, and approach frequency data indicating the number of times that the transportation vehicle has approached the loading machine.

3. The construction management system according to claim 1, wherein
when the intensity is equal to or higher than a threshold value, the work management section determines that a loading function of the loading machine loading cargo onto the transportation vehicle is being performed.

4. The construction management system according to claim 1, wherein
when the intensity has changed from a value equal to or higher than the threshold value to a value lower than the threshold value, the work management section determines that a transportation function of the transportation vehicle transporting cargo has started.

5. The construction management system according to claim 1, wherein
the work management section is provided in the mobile terminal, and
the mobile terminal has a storage section configured to store the result data.

6. The construction management system according to claim 5, further comprising a server, wherein
the mobile terminal has a transmission section configured to transmit by radio the result data stored in the storage section to the server.

7. The construction management system according to claim 1, further comprising a server configured to communicate by radio with a transmission section provided in the mobile terminal, wherein
the work management section is provided in the server.

8. The construction management system according to claim 1, wherein
the specific data of the transportation vehicle includes at least one of transportation vehicle identification data for specifying the transportation vehicle, operator identification data indicating an operator who operates the transportation vehicle, and maximum load data indicating a maximum load of the transportation vehicle.

9. The construction management system according to claim 1, further comprising:
a second transmitter disposed in the loading machine and configured to transmit radio waves;
a second reception section provided in the mobile terminal and configured to receive the radio waves from the second transmitter; and
a second detection section provided in the mobile terminal and configured to detect intensity of the radio waves received by the second reception section, wherein
the work management section determines whether or not an operator carrying the mobile terminal is occupying the loading machine based on the intensity of the radio waves detected by the second detection section.

10. A construction management system comprising:
a transmitter disposed in a loading machine and configured to transmit radio waves including specific data of the loading machine;
a mobile terminal disposed in a transportation vehicle;
a reception section provided in the mobile terminal and configured to receive the radio waves from the transmitter;
a detection section provided in the mobile terminal and configured to detect intensity of the radio waves received by the reception section;
a specific data acquisition section provided in the mobile terminal and configured to acquire the specific data from the radio waves received by the reception section; and
a work management section configured to generate result data indicating that the loading machine has approached the transportation vehicle based on the intensity detected by the detection section and the specific data acquired by the specific data acquisition section.

11. The construction management system according to claim 10, wherein
the result data includes at least one of approach time-point data indicating a time point at which the loading machine has approached the transportation vehicle, separation time-point data indicating a time point at which the loading machine has separated from the transportation vehicle, and approach frequency data indicating the number of times that the loading machine has approached the transportation vehicle.

12. The construction management system according to claim 10, wherein
when the intensity is equal to or higher than a threshold value, the work management section determines that a loading function of the loading machine loading cargo onto the transportation vehicle is being performed.

13. The construction management system according to claim 10, wherein
when the intensity has changed from a value equal to or higher than the threshold value to a value lower than the threshold value, the work management section determines that a transportation function of the transportation vehicle transporting cargo has started.

14. The construction management system according to claim 10, wherein
the work management section is provided in the mobile terminal, and
the mobile terminal has a storage section configured to store the result data.

15. The construction management system according to claim 14, further comprising a server, wherein
the mobile terminal has a transmission section configured to transmit by radio the result data stored in the storage section to the server.

16. The construction management system according to claim 10, further comprising a server configured to communicate by radio with a transmission section provided in the mobile terminal, wherein
the work management section is provided in the server.

17. The construction management system according to claim 10, wherein
the specific data of the loading machine includes at least one of loading machine identification data for specifying the loading machine and operator identification data indicating an operator who operates the loading machine.

18. The construction management system according to claim 10, further comprising:
a second transmitter disposed in the transportation vehicle and configured to transmit radio waves;
a second reception section provided in the mobile terminal and configured to receive the radio waves from the second transmitter; and
a second detection section provided in the mobile terminal and configured to detect intensity of the radio waves received by the second reception section, wherein
the work management section determines whether or not an operator carrying the mobile terminal is occupying the transportation vehicle based on the intensity of the radio waves detected by the second detection section.

* * * * *